US011882438B2

(12) United States Patent
Skoda

(10) Patent No.: US 11,882,438 B2
(45) Date of Patent: Jan. 23, 2024

(54) NETWORK-ENABLED ELECTRONIC CIGARETTE

(71) Applicant: Zorday IP, LLC, Mayfield Village, OH (US)

(72) Inventor: Brent M. Skoda, Irving, TX (US)

(73) Assignee: Zorday IP, LLC

( * ) Notice: Subject to any disclaimer, the term of this patent is extended or adjusted under 35 U.S.C. 154(b) by 0 days.

(21) Appl. No.: 16/666,003

(22) Filed: Oct. 28, 2019

(65) Prior Publication Data
US 2020/0137570 A1  Apr. 30, 2020

Related U.S. Application Data

(60) Provisional application No. 62/751,849, filed on Oct. 29, 2018.

(51) Int. Cl.
*H04W 12/06* (2021.01)
*H04L 9/40* (2022.01)
(Continued)

(52) U.S. Cl.
CPC .............. *H04W 12/06* (2013.01); *A24F 40/53* (2020.01); *H04L 63/08* (2013.01); *H04L 63/0861* (2013.01); *A24F 40/65* (2020.01)

(58) Field of Classification Search
None
See application file for complete search history.

(56) References Cited

U.S. PATENT DOCUMENTS 4,511,045 A * 4/1985 Seragnoli ............. A24C 5/3412
209/535
5,372,148 A * 12/1994 McCafferty ............. A24F 40/51
131/194
(Continued)

FOREIGN PATENT DOCUMENTS

WO  WO-2017056103 A1 * 4/2017 ............. A24F 40/50

OTHER PUBLICATIONS

Williams et al "Content Analysis of Age Verification, Purchase and Delivery Methods of Internet E-Cigarette Vendors," 2013 and 2014, pp. 287-293, May 2018 (Year: 2018).*
(Continued)

*Primary Examiner* — Luu T Pham
*Assistant Examiner* — James J Wilcox
(74) *Attorney, Agent, or Firm* — Foley & Lardner LLP

(57) ABSTRACT

At least one aspect of the present disclosure is directed to a system for verifying the identity of a user of a nicotine dispenser. The system can include a nicotine dispenser configured to remain locked until the receipt of a signal, and a personal communication device configured to communicate with the nicotine dispenser via a wireless communication link. The personal communication device can execute an application configured to scan identification data of the user, verify the identification data of the user, and communicate the identification signal to the user. Another aspect of the present disclosure is directed to a system for monitoring and controlling use of a nicotine dispenser. The system can include a nicotine dispenser, a processor, and a nicotine-containing unit. The processor can be configured to monitor use of the nicotine dispenser, determine an amount of nicotine dispensed is greater than a threshold, and lock the nicotine dispenser.

19 Claims, 4 Drawing Sheets

(51) Int. Cl.
    *A24F 40/53* (2020.01)
    *A24F 40/65* (2020.01)

(56) References Cited

U.S. PATENT DOCUMENTS

| | | | | |
|---|---|---|---|---|
| 5,533,493 A * | 7/1996 | Atanasyan | B60K 15/03504 | 123/520 |
| 5,675,144 A * | 10/1997 | Focke | A24C 5/3412 | 209/356 |
| 9,864,947 B1 * | 1/2018 | Sur | G06K 19/07788 | |
| 10,194,696 B2 * | 2/2019 | Matischek | H04B 5/0075 | |
| 10,325,596 B1 * | 6/2019 | Tran | G10L 15/1822 | |
| 10,357,063 B1 * | 7/2019 | Fornarelli | A61M 15/06 | |
| 10,369,966 B1 * | 8/2019 | Higgins | G07C 9/00571 | |
| 10,440,999 B2 * | 10/2019 | Tremblay | A24F 40/65 | |
| 10,607,211 B2 * | 3/2020 | Schroeder | H04L 63/0838 | |
| 10,761,084 B1 * | 9/2020 | Lantz | G06Q 50/265 | |
| 11,284,646 B2 * | 3/2022 | Janardhan | G10L 25/18 | |
| 11,501,652 B2 * | 11/2022 | Gamygin | G09B 19/0092 | |
| 2003/0150451 A1 * | 8/2003 | Shayan | A61M 11/042 | 128/203.12 |
| 2004/0031497 A1 * | 2/2004 | Likness | A24F 40/51 | 131/270 |
| 2005/0097179 A1 * | 5/2005 | Orme | H04L 63/083 | 726/26 |
| 2006/0166564 A1 * | 7/2006 | Baranowski | H01R 13/641 | 439/700 |
| 2007/0167084 A1 * | 7/2007 | Baranowski | H01R 24/58 | 439/668 |
| 2010/0307518 A1 * | 12/2010 | Wang | A24F 40/53 | 131/270 |
| 2011/0277764 A1 * | 11/2011 | Terry | A61M 11/042 | 128/203.26 |
| 2012/0022930 A1 * | 1/2012 | Brouhard | G06Q 30/0229 | 705/14.3 |
| 2012/0022944 A1 * | 1/2012 | Volpi | G06Q 30/0207 | 705/14.1 |
| 2012/0260323 A1 * | 10/2012 | San Vicente | A61B 5/14532 | 455/66.1 |
| 2012/0291791 A1 * | 11/2012 | Pradeep | A24F 40/53 | 131/273 |
| 2013/0042865 A1 * | 2/2013 | Monsees | A61M 11/00 | 128/203.27 |
| 2013/0078912 A1 * | 3/2013 | San Vicente | G16H 40/67 | 455/39 |
| 2013/0199528 A1 * | 8/2013 | Goodman | A61M 15/0091 | 392/394 |
| 2013/0284192 A1 * | 10/2013 | Peleg | A24F 40/53 | 131/329 |
| 2013/0290096 A1 * | 10/2013 | Lizotte, III | G06Q 30/0246 | 705/14.45 |
| 2013/0319435 A1 * | 12/2013 | Flick | A61M 11/041 | 219/490 |
| 2013/0319439 A1 * | 12/2013 | Gorelick | A24F 40/65 | 131/329 |
| 2013/0340775 A1 * | 12/2013 | Juster | H04L 12/1827 | 131/273 |
| 2014/0014126 A1 * | 1/2014 | Peleg | A24F 40/57 | 374/54 |
| 2014/0020693 A1 * | 1/2014 | Cochand | A61M 11/041 | 131/273 |
| 2014/0060552 A1 * | 3/2014 | Cohen | A61M 15/06 | 131/273 |
| 2014/0074696 A1 * | 3/2014 | Glaser | G06F 21/32 | 726/19 |
| 2014/0096781 A1 * | 4/2014 | Sears | A24F 40/50 | 131/328 |
| 2014/0096782 A1 * | 4/2014 | Ampolini | A24F 40/53 | 131/328 |
| 2014/0183269 A1 * | 7/2014 | Glaser | G06K 19/07701 | 235/492 |
| 2014/0230835 A1 * | 8/2014 | Saliman | A24F 40/60 | 131/329 |
| 2014/0246035 A1 * | 9/2014 | Minskoff | A24F 40/65 | 131/329 |
| 2014/0253144 A1 * | 9/2014 | Novak, III | A24F 40/53 | 324/550 |
| 2014/0266584 A1 * | 9/2014 | Ingle | A24F 15/005 | 340/5.28 |
| 2014/0306799 A1 * | 10/2014 | Ricci | G01C 21/26 | 340/5.83 |
| 2014/0306833 A1 * | 10/2014 | Ricci | G06F 16/583 | 340/901 |
| 2014/0306834 A1 * | 10/2014 | Ricci | G08B 25/016 | 340/902 |
| 2014/0309789 A1 * | 10/2014 | Ricci | G06F 16/25 | 700/276 |
| 2014/0309806 A1 * | 10/2014 | Ricci | G05D 23/1917 | 701/1 |
| 2014/0309813 A1 * | 10/2014 | Ricci | H04N 21/41422 | 701/1 |
| 2014/0309814 A1 * | 10/2014 | Ricci | H04N 21/41422 | 701/2 |
| 2014/0309849 A1 * | 10/2014 | Ricci | H04W 36/32 | 701/33.4 |
| 2014/0309862 A1 * | 10/2014 | Ricci | B60R 16/037 | 701/36 |
| 2014/0309863 A1 * | 10/2014 | Ricci | H04W 4/12 | 701/36 |
| 2014/0309866 A1 * | 10/2014 | Ricci | G06F 21/32 | 701/36 |
| 2014/0309868 A1 * | 10/2014 | Ricci | G06Q 30/0633 | 701/36 |
| 2014/0309871 A1 * | 10/2014 | Ricci | G06Q 30/012 | 701/36 |
| 2014/0309874 A1 * | 10/2014 | Ricci | G06F 3/017 | 701/36 |
| 2014/0309927 A1 * | 10/2014 | Ricci | G06V 40/28 | 701/424 |
| 2014/0310031 A1 * | 10/2014 | Ricci | H04W 4/12 | 705/5 |
| 2014/0310103 A1 * | 10/2014 | Ricci | H04W 12/088 | 705/14.62 |
| 2014/0310739 A1 * | 10/2014 | Ricci | G06Q 20/321 | 725/75 |
| 2014/0310788 A1 * | 10/2014 | Ricci | G06V 40/166 | 726/6 |
| 2014/0334471 A1 * | 11/2014 | Chen | H04W 12/088 | 370/338 |
| 2014/0334804 A1 * | 11/2014 | Choi | A24F 40/485 | 392/404 |
| 2014/0338685 A1 * | 11/2014 | Amir | H05B 1/0244 | 131/329 |
| 2014/0345633 A1 * | 11/2014 | Talon | A24F 40/53 | 702/30 |
| 2014/0378790 A1 * | 12/2014 | Cohen | A61B 5/486 | 600/309 |
| 2015/0100441 A1 * | 4/2015 | Alarcon | G06Q 20/20 | 705/16 |
| 2015/0101625 A1 * | 4/2015 | Newton | A24F 40/60 | 131/329 |
| 2015/0114407 A1 * | 4/2015 | Duncan | A24F 40/53 | 131/329 |
| 2015/0114408 A1 * | 4/2015 | Lord | H05B 1/0244 | 131/329 |
| 2015/0122252 A1 * | 5/2015 | Frija | A24F 40/65 | 128/202.21 |
| 2015/0128971 A1 * | 5/2015 | Verleur | H02J 7/0045 | 131/329 |
| 2015/0128976 A1 * | 5/2015 | Verleur | H02J 7/0045 | 131/329 |
| 2015/0136153 A1 * | 5/2015 | Lord | A24F 40/53 | 131/328 |
| 2015/0136158 A1 * | 5/2015 | Stevens | A24F 40/53 | 131/329 |
| 2015/0142387 A1 * | 5/2015 | Alarcon | A24F 40/53 | 702/187 |
| 2015/0156184 A1 * | 6/2015 | Tucker | H04L 63/0876 | 713/168 |

(56) References Cited

U.S. PATENT DOCUMENTS

| | | | |
|---|---|---|---|
| 2015/0173124 A1* | 6/2015 | Qiu | A24F 40/60 131/328 |
| 2015/0181945 A1* | 7/2015 | Tremblay | A24F 40/60 131/328 |
| 2015/0208729 A1* | 7/2015 | Monsees | H02J 7/00309 131/329 |
| 2015/0208731 A1* | 7/2015 | Malamud | H05B 1/0244 131/328 |
| 2015/0225398 A1* | 8/2015 | Sabourault | H04W 4/80 514/228.5 |
| 2015/0245660 A1* | 9/2015 | Lord | A24F 40/60 131/328 |
| 2015/0257447 A1* | 9/2015 | Sullivan | A61M 15/06 131/329 |
| 2015/0272220 A1* | 10/2015 | Spinka | A24F 40/60 131/329 |
| 2015/0317465 A1* | 11/2015 | McCarty | G06F 16/2365 726/19 |
| 2015/0319168 A1* | 11/2015 | McCarty | H04L 63/102 713/186 |
| 2015/0320116 A1* | 11/2015 | Bleloch | A24F 40/44 219/628 |
| 2015/0359263 A1* | 12/2015 | Bellinger | H05B 1/0244 392/394 |
| 2016/0004820 A1* | 1/2016 | Moore | G16H 15/00 705/3 |
| 2016/0029697 A1* | 2/2016 | Shafer | G05F 1/66 131/328 |
| 2016/0050196 A1* | 2/2016 | Wu | H04L 63/083 726/7 |
| 2016/0050974 A1 | 2/2016 | Galloway et al. | |
| 2016/0100633 A1* | 4/2016 | Gao | H05B 1/0244 131/329 |
| 2016/0106936 A1* | 4/2016 | Kimmel | A24F 40/485 392/404 |
| 2016/0143361 A1* | 5/2016 | Juster | H05B 1/0244 392/404 |
| 2016/0157523 A1* | 6/2016 | Liu | A24F 40/53 392/395 |
| 2016/0157524 A1* | 6/2016 | Bowen | G01K 7/22 702/50 |
| 2016/0158782 A1* | 6/2016 | Henry, Jr. | A24F 40/53 700/275 |
| 2016/0171201 A1* | 6/2016 | Schröder | H04W 12/06 726/20 |
| 2016/0198767 A1* | 7/2016 | Verleur | A24F 40/40 392/386 |
| 2016/0206000 A1* | 7/2016 | Lord | H03K 17/97 |
| 2016/0219938 A1* | 8/2016 | Mamoun | G05B 15/02 |
| 2016/0227840 A1* | 8/2016 | Xiang | A24F 40/51 |
| 2016/0269375 A1* | 9/2016 | Wu | H04L 63/08 |
| 2016/0278435 A1* | 9/2016 | Choukroun | A24F 40/50 |
| 2016/0309787 A1* | 10/2016 | Hawes | A24F 40/42 |
| 2016/0309788 A1* | 10/2016 | Hawes | A61M 15/06 |
| 2016/0331027 A1* | 11/2016 | Cameron | B05B 15/40 |
| 2016/0331915 A1* | 11/2016 | Goodman | A24F 40/53 |
| 2016/0337362 A1* | 11/2016 | Cameron | G06Q 20/3278 |
| 2016/0345630 A1* | 12/2016 | Mironov | H05B 3/34 |
| 2016/0360785 A1* | 12/2016 | Bless | A24F 40/53 |
| 2016/0360786 A1* | 12/2016 | Bellinger | A24F 40/46 |
| 2016/0366946 A1* | 12/2016 | Murison | B67D 7/02 |
| 2017/0020188 A1* | 1/2017 | Cameron | A24F 40/60 |
| 2017/0020191 A1* | 1/2017 | Lamb | A61M 15/06 |
| 2017/0020195 A1* | 1/2017 | Cameron | A24F 40/51 |
| 2017/0027229 A1* | 2/2017 | Cameron | H04L 67/12 |
| 2017/0027234 A1* | 2/2017 | Farine | A24F 40/53 |
| 2017/0033568 A1* | 2/2017 | Holzherr | H05B 1/0244 |
| 2017/0042231 A1* | 2/2017 | Cameron | A24F 40/65 |
| 2017/0042246 A1* | 2/2017 | Lau | H05B 3/12 |
| 2017/0055587 A1* | 3/2017 | Zinovik | H05B 6/108 |
| 2017/0064551 A1* | 3/2017 | Block | G06Q 20/341 |
| 2017/0064996 A1* | 3/2017 | Mironov | H05B 6/108 |
| 2017/0064997 A1* | 3/2017 | Murison | H02J 7/0044 |
| 2017/0119052 A1* | 5/2017 | Williams | H05B 3/44 |
| 2017/0135407 A1* | 5/2017 | Cameron | A24F 40/60 |
| 2017/0135408 A1* | 5/2017 | Cameron | A24F 40/51 |
| 2017/0136193 A1* | 5/2017 | Cameron | A24F 40/48 |
| 2017/0136301 A1* | 5/2017 | Cameron | A24F 40/65 |
| 2017/0150755 A1* | 6/2017 | Batista | A24F 40/42 |
| 2017/0156399 A1* | 6/2017 | Freeman | A61M 15/06 |
| 2017/0181475 A1* | 6/2017 | Cameron | A24F 40/53 |
| 2017/0189629 A1* | 7/2017 | Newberry | A61B 5/087 |
| 2017/0196270 A1* | 7/2017 | Vick | H02J 7/0042 |
| 2017/0207499 A1* | 7/2017 | Leadley | A24F 40/95 |
| 2017/0224016 A1* | 8/2017 | Reevell | H05B 3/04 |
| 2017/0231280 A1* | 8/2017 | Anton | A24F 40/65 392/404 |
| 2017/0238610 A1* | 8/2017 | Reevell | G06F 1/3203 |
| 2017/0242428 A1* | 8/2017 | Pal | H04W 4/90 |
| 2017/0245552 A1* | 8/2017 | Reevell | H05B 1/0227 |
| 2017/0245553 A1* | 8/2017 | Reevell | H05B 3/04 |
| 2017/0251724 A1* | 9/2017 | Lamb | A24F 40/60 |
| 2017/0251725 A1* | 9/2017 | Buchberger | A24F 40/53 |
| 2017/0258136 A1* | 9/2017 | Hawes | G08C 17/02 |
| 2017/0258137 A1* | 9/2017 | Smith | A24F 40/53 |
| 2017/0302089 A1* | 10/2017 | Bernauer | H01M 10/44 |
| 2017/0303588 A1* | 10/2017 | Batista | H05B 3/26 |
| 2017/0318861 A1* | 11/2017 | Thorens | A24F 40/53 |
| 2017/0340013 A1* | 11/2017 | Silvestrini | A61M 15/06 |
| 2017/0340016 A1* | 11/2017 | Thorens | A24F 40/40 |
| 2017/0360088 A1* | 12/2017 | Pijnenburg | A24F 40/53 |
| 2018/0018435 A1* | 1/2018 | Marshall | G16H 40/20 |
| 2018/0020720 A1* | 1/2018 | Matischek | H05B 1/0297 131/329 |
| 2018/0020729 A1* | 1/2018 | Alarcon | G05D 23/1927 392/404 |
| 2018/0020735 A1* | 1/2018 | Bilat | H05B 3/44 131/328 |
| 2018/0027412 A1* | 1/2018 | Mandapaka | H04W 17/318 713/151 |
| 2018/0055090 A1* | 3/2018 | Tucker | A24F 40/53 |
| 2018/0060873 A1* | 3/2018 | Chu | G06K 19/10 |
| 2018/0070632 A1* | 3/2018 | Sur | A24F 40/51 |
| 2018/0071274 A1* | 3/2018 | Havercroft | A61K 47/12 |
| 2018/0098574 A1* | 4/2018 | Sur | G01F 23/292 |
| 2018/0109906 A1* | 4/2018 | Sentz | H04W 12/06 |
| 2018/0110077 A1* | 4/2018 | Mandapaka | A61B 5/0004 |
| 2018/0132529 A1* | 5/2018 | Sur | H05B 1/0244 |
| 2018/0132530 A1* | 5/2018 | Rogers | A24F 40/53 |
| 2018/0136338 A1* | 5/2018 | Sur | A24F 40/60 |
| 2018/0140013 A1* | 5/2018 | Sur | H01M 16/003 |
| 2018/0140016 A1* | 5/2018 | Thorens | A61M 15/0068 |
| 2018/0146708 A1* | 5/2018 | Batista | A24F 40/53 |
| 2018/0153219 A1* | 6/2018 | Verleur | A24F 40/40 |
| 2018/0154103 A1* | 6/2018 | Davis | A61M 11/041 |
| 2018/0176727 A1* | 6/2018 | Williams | A61B 5/6802 |
| 2018/0177231 A1* | 6/2018 | Woodbine | A24F 40/53 |
| 2018/0177238 A1* | 6/2018 | Bessant | G01C 9/18 |
| 2018/0182491 A1* | 6/2018 | Belliveau | A61M 5/142 |
| 2018/0206553 A1* | 7/2018 | Reevell | A24F 40/50 |
| 2018/0214645 A1* | 8/2018 | Reevell | A24F 40/53 |
| 2018/0220711 A1* | 8/2018 | Suzuki | A24F 40/65 |
| 2018/0242634 A1* | 8/2018 | Sur | A24F 40/00 |
| 2018/0242644 A1* | 8/2018 | Bessant | H05B 3/34 |
| 2018/0256835 A1* | 9/2018 | Fornarelli | A24F 40/60 |
| 2018/0263283 A1* | 9/2018 | Popplewell | G05B 13/024 |
| 2018/0263288 A1* | 9/2018 | Goldstein | A61M 11/042 |
| 2018/0271155 A1* | 9/2018 | Baker | A24F 40/60 |
| 2018/0279688 A1* | 10/2018 | Qiu | A24F 40/48 |
| 2018/0280637 A1* | 10/2018 | Mayle | A24F 40/60 |
| 2018/0286207 A1* | 10/2018 | Baker | A24F 40/65 |
| 2018/0295886 A1* | 10/2018 | Freeman | A61M 15/0065 |
| 2018/0296777 A1* | 10/2018 | Terry | A61M 15/0001 |
| 2018/0301915 A1* | 10/2018 | Colotte | H05B 1/0244 |
| 2018/0303161 A1* | 10/2018 | Bilat | A24B 15/167 |
| 2018/0303163 A1 | 10/2018 | Baker et al. | |
| 2018/0338527 A1* | 11/2018 | Sur | A61B 5/318 |
| 2018/0338537 A1* | 11/2018 | Yan | A24F 40/53 |
| 2018/0368474 A1* | 12/2018 | Bache | A24F 40/53 |
| 2019/0000144 A1* | 1/2019 | Bless | G06K 7/10366 |
| 2019/0000357 A1* | 1/2019 | Ross | G16H 40/67 |
| 2019/0014824 A1* | 1/2019 | Yazbeck | A61M 15/06 |

(56) References Cited

U.S. PATENT DOCUMENTS

| | | | |
|---|---|---|---|
| 2019/0021400 A1* | 1/2019 | Fornarelli | A24F 7/00 |
| 2019/0038856 A1* | 2/2019 | Boone, Jr. | A24F 40/60 |
| 2019/0053538 A1* | 2/2019 | Batista | A24F 40/42 |
| 2019/0053543 A1* | 2/2019 | Lau | A24F 40/53 |
| 2019/0053545 A1* | 2/2019 | Cameron | A24F 40/48 |
| 2019/0058970 A1* | 2/2019 | Baker | A24F 40/95 |
| 2019/0059446 A1* | 2/2019 | Kessler | H05B 1/0297 |
| 2019/0069599 A1* | 3/2019 | Monsees | H05B 3/44 |
| 2019/0082737 A1* | 3/2019 | Smith | A24F 40/51 |
| 2019/0087302 A1* | 3/2019 | Smith | A24F 40/51 |
| 2019/0109713 A1* | 4/2019 | Clark | H04L 9/3239 |
| 2019/0109714 A1* | 4/2019 | Clark | H04L 9/3226 |
| 2019/0109820 A1* | 4/2019 | Clark | H04L 9/16 |
| 2019/0109848 A1* | 4/2019 | Clark | H04L 63/1441 |
| 2019/0132801 A1* | 5/2019 | Kamath | H04L 63/101 |
| 2019/0142067 A1* | 5/2019 | Martzel | A24F 40/53 131/329 |
| 2019/0149334 A1* | 5/2019 | Van Der Velden | H04L 9/30 713/185 |
| 2019/0158938 A1* | 5/2019 | Bowen | H04M 1/72415 |
| 2019/0174826 A1* | 6/2019 | Zhu | H05B 3/04 |
| 2019/0174833 A1* | 6/2019 | Shuster | A24F 9/12 |
| 2019/0183185 A1* | 6/2019 | Manas | A24F 40/53 |
| 2019/0200675 A1* | 7/2019 | Bache | H05B 3/16 |
| 2019/0200677 A1* | 7/2019 | Chong | A61M 15/0021 |
| 2019/0208822 A1* | 7/2019 | Mullin | A24F 40/53 |
| 2019/0259014 A1* | 8/2019 | Katayama | G06F 3/14 |
| 2019/0295304 A1* | 9/2019 | Janardhan | G06T 13/60 |
| 2019/0312883 A1* | 10/2019 | McCarter | H04L 9/088 |
| 2019/0323982 A1* | 10/2019 | Yoshikawa | G01N 33/0031 |
| 2019/0350257 A1* | 11/2019 | Sur | H04B 5/0031 |
| 2019/0364971 A1* | 12/2019 | Soriano | A61M 11/042 |
| 2019/0365283 A1* | 12/2019 | Chou | G16H 40/67 |
| 2019/0378143 A1* | 12/2019 | Volpi | G06Q 30/02 |
| 2019/0387792 A1* | 12/2019 | Qiu | A24F 40/53 |
| 2019/0387796 A1* | 12/2019 | Cohen | A24F 40/30 |
| 2020/0000143 A1* | 1/2020 | Anderson | G06F 18/22 |
| 2020/0029619 A1* | 1/2020 | Sundberg | H01M 50/213 |
| 2020/0035478 A1* | 1/2020 | Takahashi | H01J 49/4225 |
| 2020/0037667 A1* | 2/2020 | Woodcock | A24F 40/53 |
| 2020/0046025 A1* | 2/2020 | Otiaba | G01R 27/02 |
| 2020/0054071 A1* | 2/2020 | Ouyang | G06V 40/172 |
| 2020/0057844 A1* | 2/2020 | Ouyang | G06F 21/31 |
| 2020/0085099 A1* | 3/2020 | Soriano | A24F 40/53 |
| 2020/0085100 A1* | 3/2020 | Hoffman | A24F 40/50 |
| 2020/0085102 A1* | 3/2020 | Qiu | A24F 40/50 |
| 2020/0093180 A1* | 3/2020 | Qiu | A24F 40/50 |
| 2020/0137570 A1* | 4/2020 | Skoda | H04W 12/06 |
| 2020/0138106 A1* | 5/2020 | Huang | G07C 9/00563 |
| 2020/0140256 A1* | 5/2020 | Setchell | H04W 4/023 |
| 2020/0154771 A1* | 5/2020 | Otiaba | H02J 7/007194 |
| 2020/0154773 A1* | 5/2020 | Lim | A24F 40/57 |
| 2020/0163380 A1* | 5/2020 | Lee | H02J 7/0044 |
| 2020/0163384 A1* | 5/2020 | Rossoll | H05B 6/10 |
| 2020/0196671 A1* | 6/2020 | Qiu | A24F 40/53 |
| 2020/0205477 A1* | 7/2020 | Qiu | A24F 40/53 |
| 2020/0229501 A1* | 7/2020 | Han | A24F 40/40 |
| 2020/0237004 A1* | 7/2020 | Larsen | A24F 40/20 |
| 2020/0237014 A1* | 7/2020 | Lee | A24B 15/16 |
| 2020/0275707 A1* | 9/2020 | Courbat | A24F 40/57 |
| 2020/0288782 A1* | 9/2020 | Qiu | A24F 40/60 |
| 2020/0323264 A1* | 10/2020 | Kim | H05B 3/20 |
| 2020/0337374 A1* | 10/2020 | Han | A24F 40/40 |
| 2020/0359703 A1* | 11/2020 | Daugherty | G06F 21/31 |
| 2020/0390158 A1* | 12/2020 | Hepworth | A61M 11/042 |
| 2020/0397048 A1* | 12/2020 | Wang | A24F 40/51 |
| 2020/0401938 A1* | 12/2020 | Etkin | G16H 50/30 |
| 2021/0059313 A1* | 3/2021 | Lauenstein | A24F 40/60 |
| 2021/0068464 A1* | 3/2021 | Lauenstein | A24F 40/50 |
| 2021/0106051 A1* | 4/2021 | Han | A24F 40/50 |
| 2021/0127748 A1* | 5/2021 | Lim | A24F 40/46 |
| 2021/0145071 A1* | 5/2021 | Butin | H05B 6/06 |
| 2021/0145072 A1* | 5/2021 | Mullin | A24F 40/50 |
| 2021/0345681 A1* | 11/2021 | Cameron | A24F 40/53 |
| 2021/0378306 A1* | 12/2021 | Angell | A24F 40/44 |
| 2021/0386125 A1* | 12/2021 | Kilger | A24F 40/42 |

OTHER PUBLICATIONS

Zhan et al "Community Detection on Anti-Vaping Campaign Audience," 2017 IEEE International Conference on Bioinformatics and Biomedicine (BIBM), pp. 891-894 (Year: 2017).*

Ramanathan et al "Face Verification Across Age Progression," IEEE Transactions on Image Processing, vol. 15, No. 11, Nov. 2006, pp. 3349-3361 (Year: 2006).*

Li et al."i-Function of Electronic Cigarette," 2011 IEEE International Conferences on Internet of Things, and Cyber, Physical and Social Computing, IEEE Computer Soceity, pp. 634-637 (Year: 2011).*

Foreign Action other than Search Report on PCT PCT/US2019/058356 dated May 14, 2021.

Foreign Search Report on PCT PCT/US2019/058356 dated Feb. 18, 2020.

* cited by examiner

NETWORK-ENABLED ELECTRONIC CIGARETTE

CROSS-REFERENCE TO RELATED APPLICATIONS

This application claims priority to U.S. Provisional Patent Application No. 62/751,849 filed on Oct. 29, 2018, the contents of which is incorporated herein by reference in its entirety.

BACKGROUND

Advancements in technology are driving overuse or abuse of nicotine, electronic cigarettes (e-cigarettes) and related products and technology. Underage consumption of e-cigarettes is also on the rise, e-cigarettes accounting for a large portion of tobacco consumption among young adults. Nicotine levels in e-cigarettes are highly variable and mislabeling of nicotine content is a common issue for e-cigarettes. There is a large amount of variability even within the e-cigarette product category. Products on the market have different ingredients and hardware, and deliver variable amounts of nicotine and potentially toxic chemicals. These factors contribute to substantial confusion about nicotine delivery dosage as well as an increase in volume of underage consumption.

SUMMARY

At least one aspect of the present disclosure is directed to a system for verifying an identity of a user of a nicotine dispenser. The system can include a nicotine dispenser configured to remain locked until an identification signal has been received. The nicotine dispenser can be further configured to communicate via a wireless communication link. The system can include a personal communication device in communication with the nicotine dispenser via the wireless communication link. The personal communication device can have an application configured to perform verification of identification data of a user. The application can have stored an association of the identification data of the user with the nicotine dispenser. The application can be further configured to scan the identification data of the user. The application can be further configured to verify the identification data of the user is associated with the nicotine dispenser to create the identification signal. The application can be further configured to communicate the identification signal to the nicotine dispenser via the wireless communication link responsive to verification. The nicotine dispenser can be further configured to unlock use of the nicotine dispenser responsive to receipt of the signal.

In some implementations, the nicotine dispenser is further configured to receive the identification signal via the wireless link. The identification signal can indicate an age of the user is greater than a predetermined threshold. In some implementations, the application is further configured to retrieve a profile of the user. The profile can identify an age of the user. In some implementations, the application is further configured to verify the identification data of the user based on a comparison between an age of the user and a predetermined threshold. In some implementations, the nicotine dispenser is attributed with a unique identifier.

In some implementations, the user is registered as the user of the nicotine dispenser based on a registration via at least one of the application or a server. The registration can create a profile of the user. The profile can include the unique identifier of the nicotine dispenser. In some implementations, the profile of the user is stored by at least one of the application or the server responsive to the registration. In some implementations, the application is further configured to verify the identification data of the user based on at least one of: voice recognition, facial recognition, biometric recognition, or personal identification recognition. In some implementations, the nicotine dispenser includes a micro-chip and a nicotine-containing unit. The micro-chip can be configured to one of enable or activate the nicotine-containing unit. In some implementations, the nicotine dispenser includes a processor configured to receive the identification signal via the wireless link and communicate with the micro-chip to one of enable or activate the nicotine-containing unit.

Another aspect of the present disclosure is directed to a system for monitoring and controlling use of a nicotine dispenser. The system can include a nicotine dispenser including a processor and a nicotine-containing unit. The processor can be configured to monitor the use of the nicotine dispenser by a user. The processor can be configured to determine, responsive to monitoring, that an amount of nicotine dispensed to the user over a period of time is greater than a predetermined use threshold. The processor can be configured to lock the nicotine-containing unit responsive to the determination.

In some implementations, the nicotine-containing unit can include a micro-chip. The processor can be further configured to communicate with the micro-chip to lock or unlock the nicotine-containing unit. In some implementations, the processor is further configured to communicate with a third-party computing device to receive the predetermined use threshold. In some implementations, the processor is further configured to communicate with the third-party computing device to provide a lock indication responsive to locking the nicotine-containing unit. In some implementations, the processor is further configured to lock or unlock the nicotine-containing unit responsive to the receipt of a signal from the third-party computing device.

In some implementations, the processor is further configured to transmit one of time data or location data regarding use of the nicotine dispenser to the third-party computing device responsive to use of the nicotine-containing unit. In some implementations, the processor is further configured to lock the nicotine-containing unit responsive to a predetermined time period of non-use. In some implementations, the processor is further configured to unlock the nicotine-containing unit responsive to determining a time-of-day corresponds to a predetermined value. In some implementations, the processor is further configured to communicate with the micro-chip to determine a compatibility of the nicotine-containing unit. In some implementations, the processor is further configured to unlock the nicotine-containing unit responsive to determining that the nicotine-containing unit is compatible.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
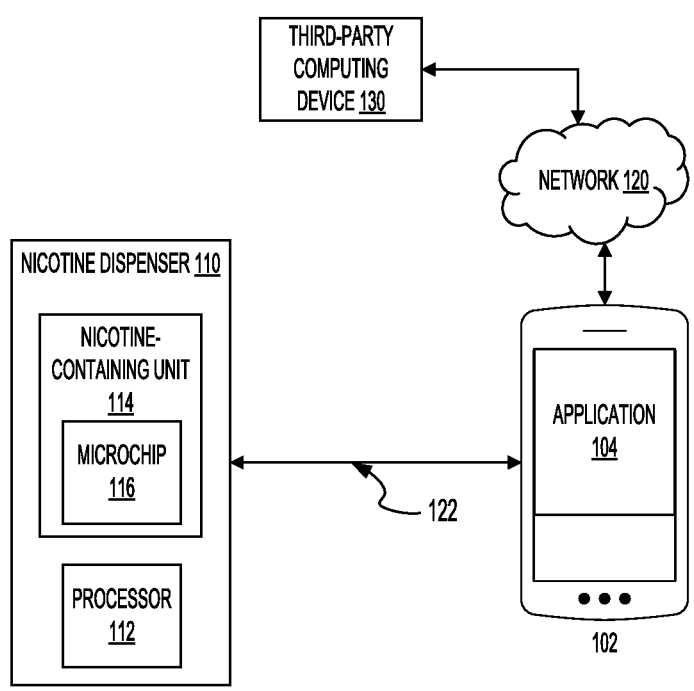
FIG. 1 is a diagram illustrating a network enabled nicotine dispenser system.

Below are detailed descriptions of various concepts related to, and implementations of, methods, apparatuses, and systems of privacy preserving determination of intersection of sets of user identifiers. The various concepts introduced above and discussed in greater detail below may be implemented in any of numerous ways, as the described concepts are not limited to any particular manner of implementation.

Nicotine dispensing devices (e.g., e-cigarettes) can dispense nicotine to users by utilizing nicotine containing units. Certain nicotine dispensing devices can include one or more safety features, designed to limit use of the device, or reduce the occurrence hardware failure due to overuse or other dangerous conditions. Such nicotine dispensing devices, however, lack the capability to provide monitoring and control by personal communication devices, third-party computing devices, or other computing devices accessed by the user of the nicotine device. Nicotine dispensing devices can be used with nicotine-containing units which are incompatible or unsafe for use. Such nicotine dispensing devices can lack the ability to determine the compatibility of nicotine-containing units, and limit the use of nicotine containing units based on certain use or non-use conditions.

Nicotine dispensing devices may also dispense nicotine to parties who may not be authorized to use the nicotine dispensing device (e.g., underage users, non-owners of the nicotine dispensing device, etc.). Such nicotine dispensing devices cannot discriminate between users authorized to use the nicotine dispensing device, and users not authorized to use the nicotine dispensing device. Certain nicotine dispensing devices are incapable of determining or providing an accurate measure of the amount of nicotine dispensed over a period of time to a particular user. Such nicotine dispensing devices or implementing policies allowing use during certain time periods and disabling use during other time periods.

To address the foregoing issues, the nicotine dispensing device described herein can communicate with a personal communication device via a wireless link to provide increased control and monitoring capabilities to both users of nicotine devices and third-parties. The nicotine dispensing device can lock the use of the nicotine dispensing device or the nicotine-containing unit in response to one or more lock conditions. For example, the nicotine dispensing device can be configured to adhere to one or more use policies which limit the overuse of nicotine related products. The nicotine dispenser can monitor, log, and communicate usage information to a personal communication device or a third-party communication device. The personal communication device or the third-party computing device can provide the nicotine dispensing device with one or more lock or unlock signals, or other usage policies.

The nicotine dispensing device as described herein, coupled with the applications and computing devices described herein, can verify the identity of a user of the nicotine dispensing device, and lock the device from use if the identity of the user cannot be verified. This provides an improvement over other nicotine dispensing devices which cannot verify the identity of users. The nicotine dispensing device can scan identification information about the user, and compare the identification data to a user profile including information such as age, amount of nicotine to dispense over a given period, and other information related to policies for dispensing nicotine. The nicotine dispensing device can also verify the compatibility of different nicotine-containing units used in conjunction with the nicotine dispensing device, to prevent issues related to incompatibility and prevent unsafe use with unauthorized nicotine-containing units. The exemplary embodiments described herein below describe implementations of the invention in conjunction with the figures briefly outlined above.

Referring now to FIG. 1, depicted is a diagram illustrating a network-enabled nicotine dispenser system 100. The system 100 environment can include at least one personal communication device 102, at least one nicotine dispenser 110, at least one network 120, and at least one third-party computing device 130. The nicotine dispenser 110 can include at least one nicotine-containing unit 114, at least one processor 112. The nicotine-containing unit 114 can include at least one microchip 116. The personal communication device 102 can include at least one application 104.

The network 120 can include computer networks such as the Internet local, wide, metro or other area networks, intranets, satellite networks, other computer networks such as voice or data mobile phone communication networks, and combinations thereof. The personal communication device 102 of the system 100 can communicate via the network 120, for instance with at least one third-party computing device 130. The network 120 may be any form of computer network that relays information between the personal communication device 102, third-party computing device 130, and one or more content sources, such as web servers, amongst others. In some implementations, the network 120 may include the Internet and/or other types of data networks, such as a local area network (LAN), a wide area network (WAN), a cellular network, a satellite network, or other types of data networks. The network 120 may also include any number of computing devices (e.g., computers, servers, routers, network switches, etc.) that are configured to receive and/or transmit data within the network 120. The network 120 may further include any number of hardwired and/or wireless connections. The personal communication device 102 may communicate wirelessly (e.g., via WiFi, cellular, radio, etc.) with a transceiver that is hardwired (e.g., via a fiber optic cable, a CAT5 cable, etc.) to other computing devices in the network 10. The personal communication device 102 and/or the nicotine dispenser 110 may also communicate wirelessly with the computing devices of the network 120 via a proxy device (e.g., a router, network switch, or gateway).

The communication link 122 can allow communication between different parties, devices, and objects. The communication link 122 can allow the nicotine dispenser 110 (e.g., the processor 112 of the nicotine dispenser 110) to communicate with the personal communication device 102. The personal communication device 102 can access the network 120 to communicate with other computing devices, for example the third-party computing device 130. The nicotine dispenser 110 can access the network 120 by communicating with the personal communication device 102 via the communication link 122 to communicate with other computing devices, for example the third-party computing device 130. The third-party computing device 130 can access the network 120 to communicate with the personal communication device 102 and/or the nicotine dispenser 110. Communicating with the nicotine dispenser 110 can include communicating with the processor 112. The communication link 122 can include a wired connection, Bluetooth, Wi-Fi, or radio frequency identification (RFID), among others. The communication link 122 can include a short-range protocol or a long-range protocol. Data can be delivered through the communication link 122. A personal communication device 102 can communicate via a plurality of communication links 122 with a plurality of nicotine dispensers 110. For example, a user may have multiple nicotine dispensers 110, each communicating with the personal communication device 102 via a respective communication link 122.

The nicotine dispenser 110 can include a processor 112. The processor 112 can run software and perform logic to transmit data to the personal communication device via a communication link 122, or perform any of the actions detailed herein in conjunction with the nicotine dispenser 110. The processor 112 can communicate with the application 104 on the personal communication device 102 to change the amount of nicotine that is dispensed from the nicotine dispenser 110. The processor 112 can control the amount of nicotine that is dispensed from the nicotine dispenser 110. For example, the processor 112 can include a protocol to reduce the amount of nicotine over the course of a year. The reduction in nicotine can include increasing amounts of nicotine over the year but ultimately resulting in a reduction of nicotine consumption by a user of the nicotine dispenser 110. The processor 112 can be configured to communicate with the personal communication device 102 via the communication link 122. In some implementations, the processor 112 can communicate with other computing devices, for example the third-party communication device 130, by accessing the network 120 via the personal communication device 102. In some implementations, the processor 112 of the nicotine dispenser 110 can access the computing devices of the network 120 by connecting directly to the network 120 via a wireless networking protocol (e.g., Bluetooth, Wi-Fi, etc.). The processor 112 can receive and transmit signals which can enable, activate, disable, or deactivate the nicotine dispenser 110 or the nicotine-containing unit 114.

The nicotine dispenser 110 can maintain a unique identifier. The unique identifier can be an integer value, a string value, or a value attributed to the nicotine dispenser at the time of its manufacture, maintained in computer memory of the nicotine dispenser 110 by the processor 112. In some implementations, the user can attribute the unique identifier to the nicotine dispenser 110 by communicating the unique identifier to the nicotine dispenser 110 from the personal communication device 102 or the third-party computing device 130. In some implementations, the unique identifier is an encrypted code, which can include encrypted device information about the nicotine dispenser 110. In some implementations, the processor 112 can communicate the unique identifier to the personal communication device 102 via the communication link 122. In some implementations, the processor 112 can communicate the unique identifier to another computing device, for example the third-party computing device, via the network 120 by communicating with the personal communication device 102.

The nicotine dispenser 110 can include the nicotine-containing unit 114. The nicotine-containing unit 114 can include a nicotine pod, refillable nicotine cartridge, or a nicotine bottle. The nicotine-containing unit 114 may be locked or remain locked until a user takes the appropriate action to notify the third-party computing device 130, for example by performing one or more verification actions using the application 104. The nicotine-containing unit 114 provide nicotine to the nicotine dispenser 110 in response to policies set by a third-party computing device 130 or other computing device. In some implementations, the nicotine-containing unit can remain locked until the receipt of a signal from the processor 112. In some implementations, the nicotine-containing unit 114 can dispense nicotine in predetermined amounts, or in amounts determined by policies defined by the third-party computing device or another computing device.

The nicotine-containing unit 114 can include a micro-chip 116. The micro-chip 116 can be required to enable and activate the nicotine dispenser 110. For example, in response to one or more conditions, the micro-chip can provide the processor 112 with a use signal if the nicotine-containing unit is safe for use. In some implementations, the processor 112 can determine the compatibility of the micro-chip 116 to activate the nicotine-containing unit 114. If a nicotine-containing unit 114 does not contain an appropriate micro-chip 116, the nicotine-containing unit 114 may be classified as incompatible. Incompatible nicotine-containing units 114 may contain dangerous levels of nicotine and other harmful chemicals. The processor 112 can detect and recognize the micro-chip 116 in the nicotine-containing unit 114. The processor 112 can detect and recognize an incompatible micro-chip on a nicotine-containing unit 114 or a nicotine-containing unit 114 that does not have a micro-chip 116. For example, if an incompatible nicotine-containing unit 114 is detected by the processor 112 in the nicotine dispenser, the nicotine-containing unit 114 can be programed not to dispense any nicotine or a reduced amount of nicotine. The nicotine dispenser 110 can be programmed to corrupt the contents of the nicotine-containing unit 114, for example by injecting a substance that destroys or neutralizes the contents of the nicotine-containing unit 114.

For example, a user may attempt to connect a nicotine-containing unit 114 whose source is unknown or has not gone through the appropriate channels verifying its identity, manufacturer, or nicotine content. The nicotine dispenser 110 can to communicate with the nicotine-containing unit 114 using the processor 112 to determine whether the nicotine-containing unit 114 is of unknown origin and contents. In some implementations, the micro-chip 116 can provide the processor 112 with encoded verification information. The processor 112 can decode the encoded verification information using a key-value to determine the compatibility of the device. The decoded information can include information about the nicotine-containing unit 114, and may include the amount of nicotine in the nicotine-containing unit 114, the manufacturer of the nicotine-containing unit 114, the date the nicotine-containing unit was manufactured, and/or a compatibility value, among others. The processor 112 can compare the compatibility value of the nicotine-containing unit 114 to a predetermined value associated with the nicotine dispenser 110. If the values are compatible (e.g., they match, or are within a predetermined range, etc.), the processor 112 can unlock the nicotine-containing unit 114. In some implementations, the processor can enable the nicotine dispenser 110 to use the nicotine-containing unit 114 (e.g., enable and/or activate the nicotine-containing unit) in response to determining the compatibility value.

The processor 112 of the nicotine dispenser 110 can lock or unlock the use of the nicotine-containing unit 114. In some implementations, locking the nicotine-containing unit 114 can include sending a signal to the micro-chip 116 to prevent the nicotine-containing unit 114 from providing nicotine. In some implementations, locking the nicotine-containing unit 114 can include preventing the nicotine dispenser 110 from utilizing the nicotine-containing unit 114 to dispense nicotine. For example, the processor 112 may prevent the nicotine dispenser 110 from providing the nicotine-containing unit 114 with electrical power to lock the nicotine-containing unit 114. The processor 112 of the nicotine dispenser 110 can unlock the nicotine-containing unit 114 by communicating a signal to the micro-chip 116. In some implementations, the processor 112 can unlock the nicotine-containing unit 114 by allowing the nicotine dispenser 110 to use the nicotine-containing unit 114 to dispense nicotine. For example, the processor 112 may enable the nicotine dispenser 110 to provide the nicotine-containing unit 114 with electrical power to unlock the nicotine-containing unit 114.

In response to locking the nicotine-containing unit 114 and/or the nicotine dispenser 110, the processor 112 can send a lock indication to the personal communication device 102 and/or the third-party computing device 130, indicating the lock event. In some implementations, the lock indication can include the time and date the device was locked. In some implementations, the lock indication can include the reason the device was locked (e.g., invalid identification information, incompatible nicotine-containing unit 114, device hardware failure, policy enforcement, overuse, etc.). In the event that invalid identification information was detected, the lock indication can include the invalid identification information. In some implementations, the processor 112 can record each lock indication in a data structure in computer memory.

The processor 112 can monitor the use of the nicotine dispenser 110 over time. The processor 112 can receive an indication (e.g., a use signal) from the nicotine dispenser 110 in response to an attempted use of the nicotine dispenser 110. In some implementations, the processor 112 can maintain a time and date value in computer memory. In some implementations, the processor 112 can receive and store updated time and date values from the personal communication device 102 via the communication link 122. In some implementations, the nicotine dispenser 110 can monitor and log additional information, for example by recording the additional information in a data structure in computer memory, for each detected use or attempted use of the nicotine dispenser 110. Additional information can include, time and date information for each time the user attempts to dispense nicotine using the nicotine dispenser 110. In some implementations, the additional information can include location tracking information of the nicotine dispenser 110 during each use. In some implementations, the processor 112 can provide the personal communication device 102 with an indication to track the location of the personal communication device in response to the use of the nicotine dispenser 110. In some implementations, the personal communication device 102 can track the location of the user instead of the processor 112. In some implementations, recording additional information can include transmitting the additional information to the personal communication device 102 via the wireless link. In some implementations, monitoring the use of the nicotine dispenser 110 can include the processor 112 determining the amount of nicotine dispensed by the nicotine dispenser 110.

The processor 112 can monitor the use of the nicotine dispenser 110 to determine the amount of nicotine dispensed over a period of time. In some implementations, the period of time can be seconds, minutes, hours, days, weeks, months, and/or years, among others. In some implementations, the period of time can be designated by an external computing device, for example the third-party computing device 130 or the personal communication device 102. In some implementations, the external computing device can communicate with the processor 112 to provide the time period to monitor the use of the nicotine dispenser 110. The processor 112 can communicate the time and date information of the monitored use, amount of nicotine dispensed, frequency of use, indications of usage patterns (e.g., certain periods of increased use), and indications of overuse. In some implementations, monitoring the use of the nicotine dispenser 110 can include tracking the number of uses of the nicotine dispenser 110 by incrementing a counter value and logging a time value corresponding to the use.

The processor 112 can compare the amount of nicotine dispensed over a period of time to a predetermined use threshold to detect overuse of the nicotine dispenser 110. In some implementations, the processor 112 can communicate with the personal communication device 102 to receive the predetermined use threshold. In some implementations, the processor 112 can communicate with the third-party computing device 130 to receive the predetermined use threshold. The predetermined use threshold can describe a limited amount of nicotine to be dispensed over a period of time. In some implementations, the predetermined use threshold can describe the number of times the user may use the nicotine dispenser 110 during a period of time. For example, the predetermined use threshold may indicate that a user may only use the nicotine dispenser 110 twenty times in one day. In another example, the predetermined use threshold may indicate that a user may only use a certain volume or mass of nicotine in one week. In some implementations, the processor 112 can compare the number of uses of the nicotine dispenser 110 to the number of uses specified in the predetermined use threshold to detect overuse.

If the processor 112 of the nicotine dispenser 110 detects overuse, the processor 112 lock the use of the nicotine dispenser 110 to prevent further overuse. In some implementations, the processor 112 can lock the nicotine dispenser 110 until a predetermined unlock date and time. The predetermined unlock date and time can be, for example, the next day, or week, or month, etc. In some implementations, the predetermined unlock date and time can be specified by the personal communication device 102 or the third-party computing device 130. In some implementations, the nicotine dispenser 110 can remain locked until receiving an unlock signal from the personal communication device 102 and/or the third-party computing device 130. The processor 112 can lock the nicotine dispenser 110 to prevent further over use. In some implementations, the processor 112 can detect when the nicotine dispenser 110 is close to an overuse 130 condition. In response, the processor 112 can slow down the delivery of nicotine via the nicotine dispenser 110. The processor 112 can communicate an overuse signal the personal communication device 110 and/or the third-party computing device 130. The overuse signal can include information such as the time and date of the overuse, the location of the overuse, and other information about the user at the time of overuse.

The nicotine dispenser 110 can receive an identification signal from the personal communication device 102 or the third-party computing device 130. In some implementations, the processor 112 of the nicotine dispenser 110 can receive the identification signal via the communication link 122. In some implementations, the processor of the nicotine dispenser 110 can receive the identification signal from the personal communication device 102 or the third-party computing device 130. In response to the receiving the identification signal, the processor 112 can unlock the nicotine dispenser and/or the nicotine-containing unit 114. In some implementations, the processor 112 can communicate with the micro-chip 116 in the nicotine-containing unit 114 to unlock, enable, and/or activate the micro-chip 116 in response to receiving the identification signal. For example, the nicotine-containing unit 114 may not provide nicotine to the nicotine dispenser 110 until the micro-chip 116 has received an activation signal. The processor can send an activation signal to the micro-chip 116 in response to the receiving the identification signal via the communication link 122. In some implementations, the identification signal includes an indication that the age of the user is greater than a predetermined age threshold. In some implementations, the identification signal includes user profile information, for example age, use policy information, and other information about the user.

The processor 112 can lock or unlock the nicotine-containing unit 114 in response to receiving a corresponding signal from the third-party computing device 130 or the personal communication device 102. For example, the third-party computing device 130 can be configured to send an unlock signal through the network 120 to the personal communication device 102. The personal communication device 102 can transmit the unlock signal received from the third-party computing device 130 to the processor 112 of the nicotine dispenser 110. Upon receiving the unlock signal, the processor 112 can communicate with the micro-chip 116 of the nicotine-containing unit 114 to enable or activate the nicotine-containing unit 114. In some implementations, unlocking the nicotine-containing unit 114 in response to receiving the signal from the third-party computing device 130 can include providing power to the nicotine-containing unit 114. The processor 112 can lock the nicotine-containing unit 114 in response to receiving a lock signal from the third-party computing device 130 or the personal communication device 102. Locking the nicotine-containing unit 114 can include communicating with the micro-chip 116 to disable use of the nicotine-containing unit 114. In some implementations, locking the nicotine-containing unit 114 can include removing power from the nicotine-containing unit 114.

The nicotine dispenser 110 can be configured to remain locked until the receipt of the identification signal. For example, the processor 112 of the nicotine dispenser 110 can send a signal to the micro-chip of the nicotine-containing unit 114 indicating that no nicotine should be provided to the nicotine dispenser 110 until the receipt of an identification signal. In some implementations, the processor 112 can remove the power to the nicotine-containing unit 114 until the receipt of the identification signal, thus preventing the nicotine-containing unit 114 from providing any nicotine. The micro-chip can disable use of the nicotine-containing unit 114. In some implementations, the processor 112 can lock the nicotine-containing unit 114 after a predetermined period of non-use. For example, if the processor determines that the nicotine dispenser 110 has not been used for a predetermined period (e.g., a few minutes, hours, days, etc.), the processor 112 can lock the nicotine-containing unit by sending a signal to the micro-chip 116. In some implementations, locking the nicotine-containing unit can include removing power from the micro-chip 116.

The processor 112 can lock or unlock the nicotine-containing unit in response to determining that a time and date condition has been reached. The processor 112 can maintain the current time and date in computer memory of the nicotine dispenser 110, and compare the time and date to a time and date condition to determine whether there is a match. If there is a match, the time and date condition can be met and the processor 112 can lock or unlock the nicotine-containing unit 114. For example, the processor 112 can unlock the nicotine-containing unit 114 at 8:00 am EST on the following day. This feature can allow the processor 112 to override any lock conditions that exist, for example a lock condition triggered by overuse of the device on a particular day. In some implementations, processor 112 can receive the time and date condition from an external computing device, for example the personal communication device 102 or the third-party computing device 130. In some implementations, the processor 112 can determine the time and date condition based on policies received from an external computing device. For example, the processor 112 may receive a policy prohibits use between the hours of 10 pm and 7 am. Upon determining that the current time of day is 10 pm, the processor 112 can lock the nicotine-containing unit 114 to prevent use of the nicotine dispenser 110. Later, upon determining that the current time of day has reached 7 am, the processor can unlock the nicotine-containing unit 114 to allow use of the nicotine dispenser 110.

The personal communication device 102 can comprise a device which may include, but is not limited to any mobile form of mobile or wireless technologies, such as, for example, by way of illustration and not limitation, a website, a mobile website, a telephone, a cellular phone, a smart phone, a computer within a motorized vehicle such as an automobile, a truck, an airplane, a tablet, a computer, a mobile application, a Google technology such as an Android device or a similar device, an Apple technology such as an iPhone, iPad, Apple TV, or a similar device, a Microsoft technology, a television, a tablet, or a drone. In some implementations, the personal communication device 102 can communicate with the network 120 using a wireless networking protocol (e.g., Wi-Fi, Bluetooth, NFC, etc.).

The personal communication device 102 may store or house an application 104. The application 104 can be an application downloaded from a remote server, website, or app store. The application 104 can include a user interface by which a user interacts with the application 104. A user of the application 104 may be required to submit a message via the application 104 or a website. The application 104 may include features to allow a third-party computing device 130 to monitor or control a nicotine dispenser 110. The application 104 may include functionality that is dictated by protocols and/or policies. The application 104 can use location services on the personal communication device 102 as input into various protocols the application 104 implements. The application 104 can require a passcode for a user to access the contents of the application 104. The application 104 can require a passcode for a user to access functionality of the nicotine dispenser 110.

The application 104 can require user identification for a user to access the contents of the application 104. The application 104 can require user identification for a user to access functionality of the nicotine dispenser 110. The application can use services located on the personal communication device (e.g. clock, acceleration, GPS) as input into protocols that the application 104 to the nicotine dispenser 110. A third-party computing device 130 can set parameters for the protocols implemented by the application 104. A third-party computing device 130 can control the functionality of the nicotine dispenser 110, including dictating the location and time of nicotine deployment. The third-party computing device 130 can set a protocol that allows the application to require authentication after a threshold of inactivity has been achieved. For example, if the application 104 does not receive a signal from the nicotine dispenser 110, it can require additional verification that the user of the nicotine dispenser is authorized to use the nicotine dispenser 110. The application 104 can control multiple nicotine dispensers 110 from the same or different manufacturers. The application 104 can track a single or multiple nicotine dispensers 110. Data from the application 104 can be stored locally, on remote servers, or in the cloud, for example in computer memory of one or more servers accessed via the network 120.

The application 104 can perform verification of identification data of a user in order to determine whether the user is authorized to use the nicotine dispenser 110. The application 104 can store an association between identification data of a user and the nicotine dispenser 110. To verify the identification data of a user before the user can use the nicotine dispenser 110, the application 104 can prompt the user to provide one or more pieces of identification data. For example, the application 104 may scan an ID card of the user associated with the nicotine dispenser 110. In some implementations, the application 104 can perform facial recognition using a camera included in the personal communication device 102. In some implementations, the application can perform vocal recognition to determine whether the user is authorized to use the nicotine dispenser 110. In response to verifying the identification data is correct, the application 104 can create an identification signal indicating that the user is authorized to use the nicotine dispenser 110. The application 104 can communicate the identification signal to the nicotine dispenser 110 in response to verifying the identification information associated with the user.

The application 104 can scan identification data associated with a user to verify the user is authorized to use the nicotine dispenser 110. In some implementations, the identification information can be an identification card (e.g., driver's license, birth certificate, government identification, social security card, etc.). In some implementations, scanning the identification information can include utilizing a camera included in the personal communication device 102 to take a picture of the identification information. Taking a picture can include scanning bar codes, quick response (QR) codes, or other identification information. The application 104 can include functionality to translate photographs of text, for example text on a driver's license, into computer readable text or numerical values. For example, the application 104 may prompt the user to take a photograph of the user's driver's license to determine the user's age is greater than a predetermined threshold. The application 104 can scan the photograph of the user to extract key data, for example, the name on the driver's license, the expiration of the driver's license, the date of birth listed on the driver's license, and/or other text based date included on the driver's license. The application 104 can perform image-to-text translation on the extracted portions of the image (e.g., optical character recognition, etc.). The application 104 can store the translated portions of the scanned identification data for further comparison and verification. In this example, based on the date of birth extracted and translated on the driver's license, the application 104 can calculate the age of the user by comparing the extracted age to the current date. Although the foregoing example has detailed the parsing of a driver's license, it should be understood that the application 104 can scan, parse, and/or extract information from any document, form, license, bar code, and QR code, among others. Upon verifying the identification information, the application 104 can create the identification signal to unlock the nicotine-containing unit 114. In some implementations, upon verifying the identification information, the application 104 can prompt for an additional form of verification.

In some implementations, the application 104 can scan additional forms of identification information, including voice recognition scanning. In some implementations, the application 104 can maintain an authorized voiceprint of an authorized user in computer memory of the personal communication device 102. In some implementations, the personal communication device 102 can retrieve the authorized voiceprint from an external computing device, for example the third-party computing device 130. Upon receiving a request to unlock the nicotine-containing unit 114, the application 104 can prompt the user to speak into the microphone included in the personal communication device 102. The application 104 can record what is spoken by the user into the microphone, and process the vocal information into a candidate voiceprint, and store the candidate voiceprint in computer memory of the personal communication device 102. The application 104 can compare the candidate voiceprint to the authorized voiceprint to determine whether they match. The authorized voiceprint can match the candidate voiceprint if they are similar enough (e.g., within 10% tolerance or difference). Upon determining that the voiceprints match, the application 104 can create the identification signal to unlock the nicotine-containing unit 114. In some implementations, upon verifying the voiceprints match, the application 104 can prompt for an additional form of verification. If the voiceprints do not match, the application 104 can provide a prompt to the user describing the verification failure, and not generate a signal to unlock nicotine-containing unit 114.

In some implementations, the application 104 can perform facial recognition as a form of identification. In some implementations, the application 104 can maintain authorized face data of an authorized user in computer memory of the personal communication device 102. In some implementations, the personal communication device 102 can retrieve the authorized face data from an external computing device, for example the third-party computing device 130. Upon receiving a request to unlock the nicotine-containing unit 114, the application 104 can prompt the user to take a picture of their face using the camera included in the personal communication device 102. The application 104 can detect, analyze, and extract candidate face data from the photo captured by the application 104. The application 104 can compare the candidate face data to the authorized face data to determine whether they match. The authorized face data can match the candidate face data if they are similar enough (e.g., within 10% tolerance or difference). Upon determining that the face data matches, the application 104 can create the identification signal to unlock the nicotine-containing unit 114. In some implementations, upon verifying the face data matches, the application 104 can prompt for an additional form of verification. If the face data does not match, the application 104 can provide a prompt to the user describing the verification failure, and not generate a signal to unlock nicotine-containing unit 114.

In some implementations, the application 104 can perform biometric data verification as a form of identification. In some implementations, the application 104 can maintain authorized biometric data (e.g., fingerprints, hair color, eye color, height, weight, etc.) of an authorized user in computer memory of the personal communication device 102. In some implementations, the personal communication device 102 can retrieve the authorized biometric data from an external computing device, for example the third-party computing device 130. Upon receiving a request to unlock the nicotine-containing unit 114, the application 104 can prompt the user to provide biometric information using the features of the personal communication device 102. For example, the gather fingerprint information, the application 104 may prompt the user to scan their fingerprint using a fingerprint scanner included in the personal communication device 102. In some implementations, the application 104 may prompt the user to scan their fingerprint using the camera included in the personal communication device 102. In some implementations, the application 104 may prompt the user to take a picture of their hair and/or eyes to determine hair color and/or eye color. The application can parse information from the pictures and the fingerprint scanner, and extract candidate biometric data. The application 104 can compare the candidate biometric data to the authorized biometric data to determine whether they match. For example, the application 104 can compare the candidate fingerprint data to the authorized data to determine if they match within a 10% tolerance. The application 104 can extract the other candidate biometric data from the pictures provided by the user, and compare to the information in the authorized biometric data to determine whether they match (e.g., are equal within a 10% threshold, etc.). Upon determining that the candidate biometric data matches the authorized biometric data, the application 104 can create the identification signal to unlock the nicotine-containing unit 114. In some implementations, upon verifying the candidate biometric data matches the authorized biometric data, the application 104 can prompt for an additional form of verification. If the biometric data does not match, the application 104 can provide a prompt to the user describing the verification failure, and not generate a signal to unlock nicotine-containing unit 114.

The personal communication device 102 can execute an application 104 which can be configured to perform verification of identification data of the user. The application 104 can use one or more of the verification methods described above herein to determine whether a user is authorized to use the nicotine dispenser 110. In response to verifying the identification data of the user, the application 104 can provide the user with a prompt indicating that the verification was successful, and communicate the identification signal to the processor 112 of the nicotine dispenser 110 to unlock the nicotine-containing unit 114. In some implementations, the application 104 can use multiple forms of verification (e.g., multi-factor verification, 2-step verification, etc.) to before sending the identification signal to the processor 112 of the nicotine dispenser 110. In some implementations, the application 104 can log, store, or otherwise record a verification event in computer memory of the personal communication device 102 or an external computing device, for example the third-party computing device 130, in response to verifying the identification data of the user. In some implementations, the identification signal can include an indication that the age of the user is greater than a predetermined threshold. For example, if there is a requirement that a user be of at least 21 years old to use the nicotine dispenser 110, the application 104 can retrieve the age of the user to determine that the user is at least 21 years old. If the user is 21 years old, the user can be authorized to use the nicotine dispenser 110, and the application 104 can communicate the identification signal to the processor 112 of the nicotine dispenser 110 including an indication that the age of the user is greater than or equal to 21.

The application 104 can verify the identification data associated with the user is associated with the nicotine dispenser 110. The application 104 can store an association between the identification data of the user and the nicotine dispenser 110. For example, the application 104 can maintain the relationship between authorized identification data of a user (e.g., personal identification data, voiceprint data, face data, biometric data, other authorized data detailed herein, etc.) to the nicotine dispenser 110 in a data structure in computer memory of the personal communication device 102. In some implementations, the application can store the unique identifier associated with the nicotine dispenser 110 along with the authorized identification data of the user, indicating that the user is authorized to use a nicotine dispenser associated with that unique identifier. In some implementations, the relationship between the authorized identification information of the user and the nicotine dispenser can be retrieved from an external computing device, for example the third-party computing device 130.

In some implementations, the application 104 can retrieve a profile of the user including the age of the user. The profile can include identification information associated with the user, identification data of the user, voiceprint data, face data, biometric data, and/or other personal and biometric data. The profile can also include the unique identifier of one or more nicotine dispensers 110 which the user is authorized to use. During verification, the application 104 can retrieve the profile to extract authorized identification information such as authorized voiceprints, authorized biometric data, authorized identification data, and/or authorized face data. The profile can be maintained by the application 104 in computer memory of the personal communication device 102 or an external computing device, for example the third-party computing device 130 or another external server.

The application 104 can associate the nicotine dispenser 110 with a user by creating a user profile including the unique identifier of the nicotine dispenser 110. The user can create the user profile using the application 104 on the personal communication device or a web-based interface accessed via an external computing device, for example the third-party computing device 130, among others. In some implementations, creating a profile for the user can include prompting the user to provide identification data. For example, the application 104 may prompt the user for name, phone number, age, email address, height, weight, and/or other identification information. In some implementations, the application 104 can also prompt the user to take one or more pictures of their face using the personal communication device 102 to extract authorized face data. The application 104 can include the authorized face data in the user profile. In some implementations, the application 104 can also prompt the user to speak predetermined words or phrases into the microphone of the personal communication device 102 to extract and generate an authorized voiceprint. The application 104 can include the authorized voiceprint in the user profile. The application 104 can prompt the user to scan their fingerprint and/or provide biometric information such as height, weight, eye color, and hair color, among others to create authorized biometric data. The application can include the authorized biometric data in the user profile. Upon creating the user profile, the application 104 can store the user profile in computer memory on the personal communication device 102 or an external computing device, for example the third-party computing device 130 or another external server. When verifying identification data of the user, the application 104 can retrieve and extract the authorized identification information (e.g., personal identification information, voiceprints, face data, biometric data, etc.) from the user profile.

The application 104 of the personal communication device 102 can execute a use policy received from the third-party computing device 130. In some implementations, a use policy can describe when the nicotine dispenser 110 can be used. For example, a policy may describe that the nicotine dispenser cannot be used between the hours of 10 pm and 7 am. In response to executing the policy, the application 104 can send a lock signal to the processor 112 of the nicotine dispenser 110 upon determining that the time of day is equal to 10 pm. Once the application 104 determines that the time of day has reached 7 am, the application 104 can send an unlock signal to the processor 112 of the nicotine dispenser 110 to enable use of the device. In some implementations, the policy may indicate that the nicotine dispenser may be used a certain number of times a day, or may dispense a limited amount of nicotine per day. For example, a policy may indicate that the nicotine dispenser 110 is not to be used more than four times in a single day. The application 104 can communicate with the processor 112 to monitor and track all uses of the nicotine dispenser 110. If the nicotine dispenser has been used four times, the application 104 can send a lock signal to the processor 112 to disable the nicotine dispenser 110, and send an unlock signal to the processor 112 the following day. Although the description of policies has been fairly limited here, it should be understood that the application 104 can communicate with the processor 112 to enforce policies of any type or design related to the use or monitoring of the nicotine dispenser 110.

The third-party computing device 130 can be an external computing device configured to communicate with the personal communication device 102 via the network 120. In some implementations, the third-party computing device 130 can include a computing device associated with: a medical doctor, a parent of a user of the nicotine dispenser 110, an athletic coach, a psychologist, a medical clinic, employer, educational institution, or a regulatory body, among others. The third-party computing device 130 may be notified through the application 104 and network 120 that an incompatible nicotine-containing unit 114 has been installed onto a nicotine dispenser 110. The third-party may lock or authorize a user of the nicotine dispenser 110 based on notification, indication, alert, or message from the application 104. The third-party computing device 130 can introduce protocols dictating the functionality of the application 104. A protocol can include a policy, which can be used to regulate, monitor, or otherwise control the use of the nicotine dispenser 110.

Multiple third-party computing devices 130 can introduce policies to the personal communication device 102. The policies can be in conflict, for example, a doctor can prescribe a nicotine cessation program policy dictating that a user of a nicotine dispenser 110 reduces their nicotine consumption by half over the course of six months while a psychologist, realizing the potential harm to this particular individual if nicotine consumption is reduced according to the regimented schedule while the user addresses other matters, may prescribe a less drastic or even no nicotine cessation program. In situations where policies are in conflict, another third-party computing device 130 can be designated as a resolver of potentially conflicting situations. A third-party computing device 130 can be designated to resolve the conflict, or an algorithm weighing different factors can be applied to resolve the conflict.

For example, the third-party computing device 130 designated to resolve conflicts can receive an indication that two policies for a particular user are in conflict. The indication can include the details of the policies, for example how the policies regulate/monitor use of the nicotine dispenser 110, and who is responsible for providing each policy, among others. The indication can also include a priority value associated with each policy/and or the person responsible for establishing the policy. Furthering the above example, the psychologist may have a higher priority than the doctor. In some implementations, the psychologist may create their policy with an indication that their policy should be associated with a higher priority than the policy provided by the doctor. The third-party computing device 130 designated to resolve policy conflicts can compare the priorities of the policies, and the priorities of the parties assigning the policies to determine which policies have a higher priority value. The third-party computing device 130 designated to resolve policy conflicts can provide the policy which is associated with the highest priority to the application 104 for enforcement.

In some implementations, the policies can take advantage of artificial intelligence (A.I) and machine learning to aggregate digital cessation programs which can be designed by various stakeholders (e.g. manufacturers, distributors, brands, doctors, and users) to help identify good or even optimal programs to efficiently reduce addiction, overuse or abuse of nicotine. The cessation programs can be distributed via the application 104 residing in the personal communication device 102. The cessation program can be designed by any of the aforementioned stakeholders on the application 104. The cessation program can be monetized and sold or transferred to another user on the system who can then utilize another party's unique digital cessation program. The policies can take into account multiple nicotine dispensers 110 from the same or different manufacturers. The policies can use A.I. or machine learning to determine how to distribute nicotine among the various devices. For example, a third-party computing device 130 can institute a policy that restricts the amount of overall nicotine dispensed to a single user to a given amount in a given day. The application 104 can track the amount of nicotine dispensed from each of the nicotine dispensers 110 a user is using so that when the daily limit of nicotine is reached across multiple devices, all of the nicotine dispensers 110 under the user's application 104 will stop dispensing nicotine for the given day. In another example, a doctor can aggregate patient information that has been tagged with certain identifying markers (e.g. demographics, age, race, gender) and use A.I and machine learning algorithms (e.g., linear regression, sparse vector machine, random forest, neural networks, etc.) to identify cessation programs that have had a proven efficacy on others with similar identifying markers or behavioral patterns. The behavioral patterns can be retrieved from the indications of use sent by the processor 112 to the personal communication device 102 and/or the third-party computing device 130. A model can be trained on a dataset of nicotine users who have both succeeded in and failed to cease the consumption of nicotine. In some implementations, the datasets can be gathered from use indications provided by the processor 112 of the nicotine dispenser 110.

In some implementations, the protocols can institute a deployment schedule of nicotine based on a variety of factors. These factors can include a nicotine user's age, location, health requirements, time of day, or historic nicotine usage. Information about the user can be received from the profile of the user, or other records via the aforementioned third-parties from third-party computing devices 130. These factors can include a third-party's authority, purview, or relationship to the nicotine user. A deployment schedule of nicotine can be organized or deployed in a variety of ways. For example, the deployment of nicotine can be eliminated completely, such as a case where a user is unauthorized to receive nicotine. The deployment of nicotine can be reduced incrementally, such as a case where a doctor prescribes a nicotine cessation program to prolong life. The deployment of nicotine can be increased, such as a case where an individual in hospice care would benefit from nicotine consumption. The deployment of nicotine can be reduced, remain constant, or increased. The deployment schedule of nicotine can be periodic or irregular. The deployment of nicotine may be a combination of the aforementioned nicotine deployments and deployment schedules. The application 104 of the personal communication device 102 can implement all protocols and policies described herein by communicating with the processor 112 of the nicotine dispenser 110.

In some implementations, the third-party computing device 130 can be operated by a manufacturer of nicotine dispensers 110 or any other third-party that could be given the authority to control the application 104. The third-party computing device 130 can remotely control the nicotine dispenser 110, regulate the nicotine dispenser 110, turn on the nicotine dispenser 110, turn off the nicotine dispenser 110, adjust dosage, regulate dosage, or adjust temperature settings, among others. The nicotine dispenser 110 can reduce the nicotine dosage in each use to gradually wean a user off a nicotine addiction according to a doctor-prescribed regimen based on policy or protocol information. An abrupt discontinuation of nicotine can lead to withdrawal symptoms which can include intense cravings for nicotine, nausea, abdominal cramping, constipation, headaches, sweating, tingling sensations in the extremities, coughing, sore throat, insomnia, difficulty concentrating, anxiety, irritability, depression, and weight gain, among others. A program in which a user of nicotine is gradually weaned off the substance can serve to reduce and perhaps eliminate typical symptoms of nicotine withdrawal. A network-enabled nicotine dispenser 110 can digitally reduce the nicotine dosage in each use to gradually wean a user's body off a nicotine addiction efficiently with limited stress on the human body.

The third-party computing device 130 can control the use of the nicotine dispenser 110 based on the geo-location of the user and the nicotine dispenser 110. For example, one way to limit improper and underage consumption of nicotine from nicotine dispensers 110 would be to target locations for their likelihood of hosting users restricted from using nicotine dispensers 110. For example, additional verification may be required in certain locations where nicotine dispenser 110 use is restricted. These locations can include universities, airplanes, airports, trains, government buildings, movie theaters, summer camps, amusement parks, music festivals, and public gathering locations. Some of these locations might have a mix of legitimate users of nicotine dispensers 110 and potentially illegal users of nicotine dispensers. For example, a music festival may be open to people of various age groups, some below the minimum age to purchase nicotine dispensers 110. For such a location, the application 104 can determine that based on relevant factors such as geolocation that there may be a high probability of underage nicotine dispenser usage.

The application 104 can use geo-location as well as cross-referencing methods to determine if a location has a particular likelihood of encouraging underage usage of nicotine dispensers 110. For example, calendars containing the dates and times of large events, information about restricted nicotine dispensing usage at certain indoor facilities or public areas, and hubs where large crowds gather can all be input into a model that determines whether additional layers of authentication or verification are required.

Figure 2:
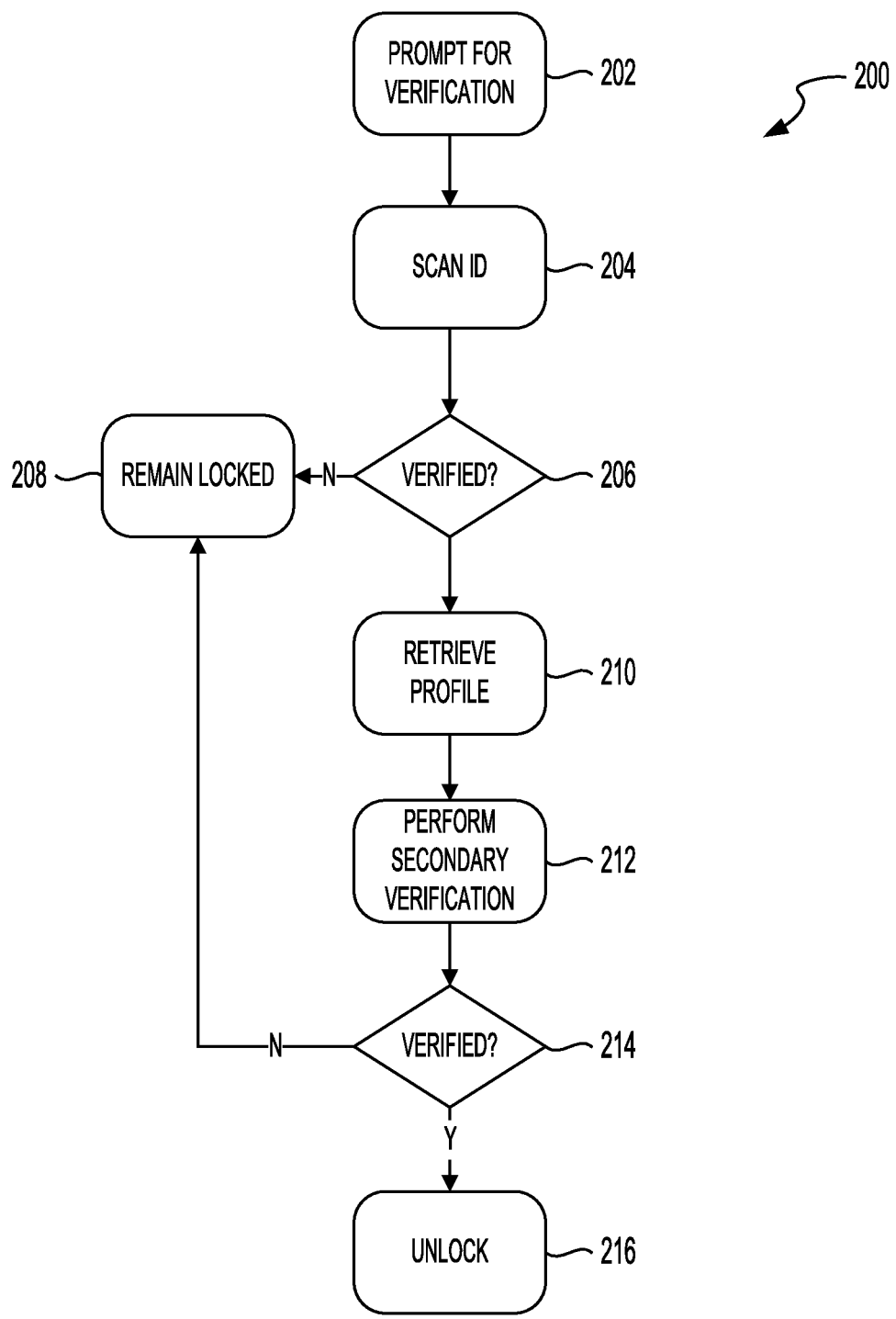
FIG. 2 is a flow-diagram of a method for verifying the identity of a user of the nicotine dispenser.

Referring now to FIG. 2, depicted is an exemplary flow diagram of a method 200 for verifying identification data of a user. The method 200 can be implemented or performed using the personal communication device 102 in conjunction with at least one nicotine dispenser 110 detailed herein above, or the computer system 400 described herein below in conjunction with FIG. 4. In brief overview, the personal communication device can prompt for verification (202). The personal communication device can scan identification information (204). The personal communication device can determine whether or not the scanned identification information can be verified (206). The personal communication device can send a signal to the nicotine dispensing device to remain locked (208). The personal communication device can retrieve the user profile (210). The personal communication device can perform a secondary verification (212). The personal communication device can determine whether the secondary verification can be properly verified (214). The personal communication device can send an unlock signal to the nicotine dispensing device (216).

The personal communication device (e.g., the personal communication device 102) can prompt the user for verification (202). For example, the personal communication device can execute an application (e.g. application 104) which can control and authorize use of the nicotine dispenser (e.g., nicotine dispenser 110). In some implementations, the application executing on the personal communication device can provide a prompt in response to receiving a request to use the nicotine dispenser 110. The prompt can include a request for the user to verify their identity, for example by entering a password, personal identification number (PIN), or logging into a user profile. In some implementations, further verification steps are required and additional prompts can be provided by the application executing on the personal communication device. For example, the application may prompt the user to provide a multi-factor authentication method, for example by entering a secondary code received via text. The prompt can include an option for the user to select a method to verify their identity. For example, the prompt could offer the user to scan personal identification information, perform vocal verification, perform facial recognition verification, or perform biometric data verification, among others. In response to the prompt, the application of the personal communication device can scan, collect, or otherwise retrieve the indicated verification information.

The personal communication device can scan identification data associated with the user (204). For example, if the prompt indicated that the user should scan personal identification information, the application executing on the personal communication device can require that the user take a picture of a personal identification document (e.g., driver's license, government identification, social security card, birth certificate, etc.). In some implementations, the application executing on the personal communication device can extract candidate identification information from the personal identification document such as name, date of birth, photograph, or license number, among others. In some implementations, the date of birth can be used to calculate the age of the user providing the personal identification document by subtracting the date of birth of the user from the current date. Other candidate identification information may be scanned by the personal communication device, for example the voice of the user, a picture of the user, and/or the fingerprint of the user. Scanning the voice of the user can include prompting the user to speak predetermined words or phrases into the microphone of the personal communication device and recording the response. A picture of the user may be obtained by prompting the user to take a picture of their face using a camera included in the personal communication device and provide it to the application 104. Fingerprint information of the user can be obtained by prompting the user to press their finger against a fingerprint scanner of the personal communication device.

The personal communication device can determine whether the scanned identification data can be verified (206). The scanned identification information may be corrupted, blurred, or unable to be analyzed by the application executing on the personal communication device. For example, the picture of the personal identification document obtained in the previous step may be too blurry to verify. If the picture is too blurry to verify, the application executing on the personal communication device may prompt the user to re-take the picture of the personal identification document. If the application determines that the information can be verified, the application can compare the age of the user obtained in the previous step to a predetermined age requirement. For example, the predetermined age requirement could be 21 years of age. The application can compare the age of the user to the predetermined age requirement to determine whether the user is at least 21 years old. If the age of the user is equal to or greater than the predetermined age requirement, the method can move to step (210) for further verification steps. In some implementations, if the age of the user is equal to or greater than the predetermined age requirement, the method can move directly to step (216) and unlock the nicotine dispenser. If the age of the user is not equal to or greater than the predetermined age requirement, the method can move to step (208) to lock the nicotine dispenser from use.

The personal communication device can send a signal to the nicotine dispensing device to remain locked (208). In some implementations, the nicotine dispensing device can remain without receiving a signal to remain locked, for example as a default mode or setting. Keeping the device locked can prevent the device from being used by individuals not authorized to use the nicotine dispenser, for example underage users, or users to which the nicotine dispenser does not belong. In some implementations, locking the nicotine dispensing device can include a signal to prevent the nicotine dispenser from activating, enabling, or unlocking until it receives an appropriate unlock signal.

The personal communication device can retrieve the user profile (210). To further verify the identity of the user, the application executing on the personal communication device can retrieve a user profile including identification information of the user along with information about nicotine dispensers associated with the user. In some implementations, the user profile can include verified personal identification information such as name, age, and date of birth, among others. In some implementations, the user profile can include verified voiceprint information to be used for voice recognition verification. In some implementations, the user profile can include verified face data to be used for facial recognition verification. In some implementations, the user profile can include verified biometric data, for example, fingerprint data, height information, weight information, hair color, and/or eye color, among others. The verified biometric data can be used for biometric data verification. The user profile can also include an association with each nicotine dispensing device associated with the user, for example a list of the unique identifiers belonging to the nicotine dispensers.

The personal communication device can perform a secondary verification (212). In some implementations, verifying the identity of a user can include providing multiple forms of identity verification. For example, if the user has already scanned their driver's license as a method of performing personal identification verification, the application executing on the personal communication device can prompt the user for secondary method of verification, for example facial recognition verification. In some implementations, the application prompt can provide multiple options for secondary verification, and allow the user to request a certain type of verification. Secondary verification can include facial recognition verification, vocal recognition verification, and/ or biometric data verification, among others. In some implementations, secondary verification can include more than one method of secondary verification. For example, the secondary verification can include prompting the user for both facial recognition verification and biometric data verification. Facial recognition verification can include prompting the user to take a picture of their face, analyzing the photo to extract face data using computer vision algorithms (e.g., Haar cascades, feature maps, etc.). Vocal recognition verification can include prompting the user to speak predetermined phrases or words into a microphone included on the personal communication device. The application can record the voice of the user and extract one or more features of the vocal signals (e.g., pitch, intonation, rhythm, etc.) to create a voiceprint of the user. Biometric data verification can include prompting the user to provide fingerprint data by pressing their finger against a fingerprint scanner included in the personal communication device.

The personal communication device can determine whether the secondary verification can be properly verified (214). Verifying the secondary information can include comparing the prompted information with the information retrieved from the user profile in step (210). For example, the user profile can include face data from the user at the time the user created the profile. To verify the face data received in step (212), the application can compare the received face data with the face data in the user profile. If the two match within a certain tolerance (e.g., 10%, etc.), the application can verify the secondary information. To verify the voiceprint calculated in step (212), the application can compare the received voiceprint data with the voiceprint in the user profile. If the two match within a certain tolerance (e.g., 10%, etc.), the application can verify the secondary information. To verify the biometric data received in step (212), the application can compare the received biometric data with the biometric data in the user profile. If the two match within a certain tolerance (e.g., 10%, etc.), the application can verify the secondary information. In some implementations, the application executing on the personal communication device much verify all secondary verification data which the user was prompted for in step (212) before verifying the secondary information. In some implementations, the secondary verification step can approve a predetermined number (e.g., two types of secondary identification) before verifying the secondary identity information. If the secondary information does not match or cannot be verified, the application can execute step (208) of the method to keep the nicotine dispenser locked. If the secondary verification information is verified, the application can execute step (216) and unlock the nicotine dispenser.

The personal communication device can send an unlock signal to the nicotine dispensing device (216). For example, the personal communication device can communicate with a processor included in the nicotine dispenser via a wireless link. The application executing on the personal communication device can transmit an unlock signal to the nicotine dispenser to allow the nicotine dispenser to provide nicotine to the user. In some implementations, the unlock signal can include an indication that the age of the user is greater than a predetermined threshold. In some implementations, the unlock signal can unlock the nicotine dispenser for a predetermined period of time (e.g., 10 minutes, one hour, etc.). In some implementations, after a predetermined time period (e.g., 10 minutes, one hour, etc.), the nicotine dispenser will automatically lock again and require an unlock signal from the personal communication device before use.

Figure 3:
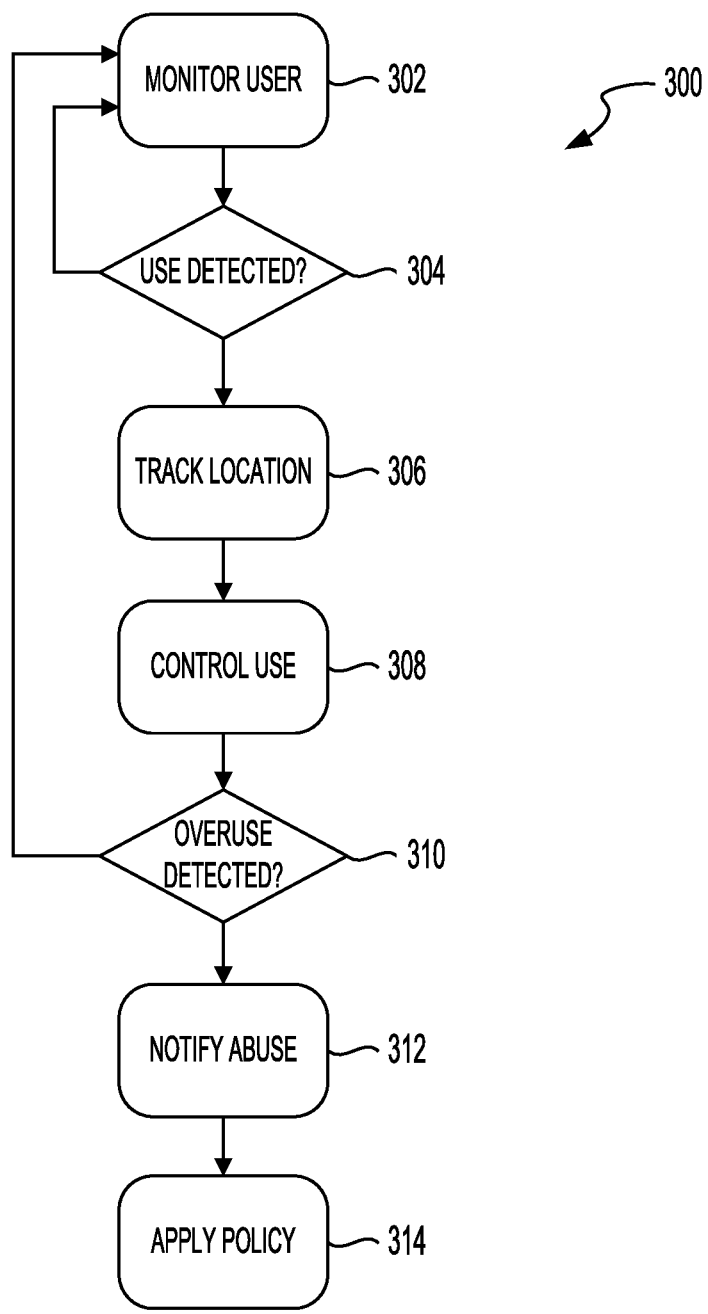
FIG. 3 is a flow-diagram of a method for monitoring the use of a nicotine dispenser.

Referring now to FIG. 3, depicted is an exemplary flow diagram of a method 300 for applying usage policies to a nicotine dispensing device. The method 300 can be implemented or performed using the third-party computing device 130 in conjunction with at least one nicotine dispenser 110 detailed herein above, or the computer system 400 described herein below in conjunction with FIG. 4. In brief overview, the third-party computing device can monitor the use of the nicotine dispenser (302). The third-party computing device can determine whether use of the nicotine dispenser has been used (304). The third-party computing device can track the location data of the nicotine dispenser (306). The third-party computing device can control the use of the nicotine dispenser (308). The third-party computing device can determine whether overuse of the nicotine dispenser has occurred (310). The third-party computing device can notify of abuse of the nicotine dispenser (312). The third-party computing device can apply a use policy to the nicotine dispenser (314).

The third-party computing device (e.g., third-party computing device 130) can monitor the use of the nicotine dispenser (e.g., nicotine dispenser 110) (302). For example, the nicotine dispenser can include a processor (e.g., processor 112), which can communicate with a personal communication device (e.g., personal communication device 102) to provide notifications of use. The personal communication device can communicate the notifications of use to the third-party computing device via a network (e.g., network 120). In some implementations, the nicotine dispenser can communicate directly with the third-party computing device via wireless communication with the network. The notifications of use sent by the nicotine dispenser can include location information (e.g., geo-location coordinates) and time and date information (e.g., the time and date nicotine is dispensed). In some implementations, the nicotine dispenser can provide the third-party computing device with location data on a predetermined schedule (e.g., once every five minutes, etc.) whether or not use was detected. Using the notifications of use, the third-party computing device can log, record, or otherwise monitor the use of the nicotine dispenser by the user. In some implementations, a user may use more than one nicotine dispenser. The third-party computing device can communicate with each nicotine dispenser to monitor use across all nicotine dispensers accessed by the user. The third-party computing device can determine whether use of the nicotine dispenser has been detected (304) by waiting and logging each of the notifications of use from the nicotine dispensers. If the third-party computing device detects use of a nicotine dispenser, the third-party computing device can execute step (306). If the third-party computing device does not detect use of the nicotine dispense, the device can continue to monitor for notifications of use in step (302).

The third-party computing device can track the location data of the nicotine dispenser (306). For example, each notification of use received by the third-party computing device can include geo-coordinates of the location of the nicotine dispenser at the time of use. These geo-location coordinates may indicate, for example, that the user is in an area where smoking is prohibited. In some implementations, additional verification may be required in certain locations where nicotine dispenser use is restricted. These locations can include universities, airplanes, airports, trains, government buildings, movie theaters, summer camps, amusement parks, music festivals, and public gathering locations. Some of these locations might have a mix of legitimate users of nicotine dispensers and potentially illegal users of nicotine dispensers. For example, a music festival may be open to people of various age groups, some below the minimum age to purchase nicotine dispensers. For such a location, the application can determine that based on relevant factors such as geolocation that there may be a high probability of underage nicotine dispenser usage. The third-party computing device can use the location information received by the computing device to retrieve other information about the surrounding location. For example, the third-party computing device can determine that the nicotine dispenser was last used in a school zone, where smoking or vaping is prohibited. In some implementations, the third-party computing device can determine that the nicotine dispenser was last used an area where smoking is allowed.

The third-party computing device can control the use of the nicotine dispenser (308). If the third-party computing device retrieves surrounding location information based on the location data of the nicotine dispenser, and the surround location information indicates that smoking and/or vaping is prohibited, the third-party computing device can lock the nicotine dispenser until it has moved to an area where smoking is allowed. In some implementations, the third-party computing device can control the use of the device by applying one or more protocols or policies. For example, a doctor may provide a smoking cessation program which is designed to help a user stop smoking. The third-party computing device can communicate instructions the nicotine dispenser to only dispense nicotine during certain times, or in certain dosages, as dictated by the policies provided by the third-party computing device. In some implementations, the third-party computing device can control the device by locking or unlocking the nicotine dispenser by providing lock or unlock signals. For example, a third-party using the third-party computing device may want to lock all nicotine dispensers associated with a particular user. If the third-party is authorized to do so (e.g., they have proper permissions to communicate with the respective nicotine dispensers), the third-party computing device can send lock signals to all nicotine dispensers. The lock signals can include an indication that the nicotine dispenser should remain locked until an unlock signal is received. In some implementations, the third-party computing device can provide an unlock signal to the nicotine dispenser to allow it to be used.

The third-party computing device can determine whether overuse of the nicotine dispenser has occurred (310). The third-party computing device may implement policies for the nicotine dispenser that dictate the number of times the nicotine dispenser should be used during a predetermined period of time. For example, a policy may dictate that the nicotine dispenser may be used four times in a day. To enforce the policy, the third-party computing device can count the number of use notifications received from the nicotine dispenser. If the number of use notifications exceeds the predetermined value, the third-party computing device can determine that the user is overusing the nicotine dispenser. If the number of use notification is less than or equal to the predetermined value, the third-party computing device can determine that the user is not overusing the nicotine dispenser. In some implementations, the overuse condition can include exceeding a certain dosage of nicotine over a certain time period. If the third-party computing device determines that an overuse condition has occurred, the third-party computing device can provide an abuse notification (312). If the third-party computing device has not detected an overuse condition, the third-party computing device can continue to monitor the use of the nicotine dispenser (302).

The third-party computing device can notify of abuse of the nicotine dispenser (312). In some implementations, notifying abuse can occur automatically or manually. In some implementations, upon detecting overuse, the third-party computing device can lock the nicotine dispenser. The third-party computing device can communicate an abuse notification to the personal communication device. The abuse notification can include information about the time and location of the abuse, as well as information describing the abuse violation of the policy (e.g., the user used the nicotine dispenser more than four times in one day). In some implementations, the third-party computing device can communicate notifications to other computing devices used by authorized third-parties, for example an athletic coach, a psychologist, a medical clinic, employer, educational institution, or a regulatory body, among others. In some implementations, the abuse notifications can include information about the user, for example information included in the user profile. In some implementations, the abuse notifications can include content and explanations about the health risks associated with a nicotine addiction and vaping. The abuse notification can also include information related to suggested treatment programs, rehabilitation centers, support groups, and local counseling centers.

The third-party computing device can apply a use policy to the nicotine dispenser (314). For example, the use policy can include periods of time when the nicotine dispenser can and cannot be used, locations where the nicotine device can and cannot be used, and/or certain amounts of nicotine which may be dispensed, among others. For example, a third-party can institute a policy that restricts the amount of overall nicotine dispensed to a single user to a given amount in a given day. The application can track the amount of nicotine dispensed from each of the nicotine dispensers a user is using so that when the daily limit of nicotine is reached across multiple device, all of the nicotine dispensers under the user's application will stop dispensing nicotine for the given day. In another example, a doctor can aggregate patient information that has been tagged with certain identifying markers (e.g. demographics, age, race, gender) and use A.I and machine learning algorithms to identify cessation programs that have had a proven efficacy on others with similar identifying markers. A model can be trained on a dataset of nicotine users who have both succeeded in and failed to cease the consumption of nicotine.

Figure 4:
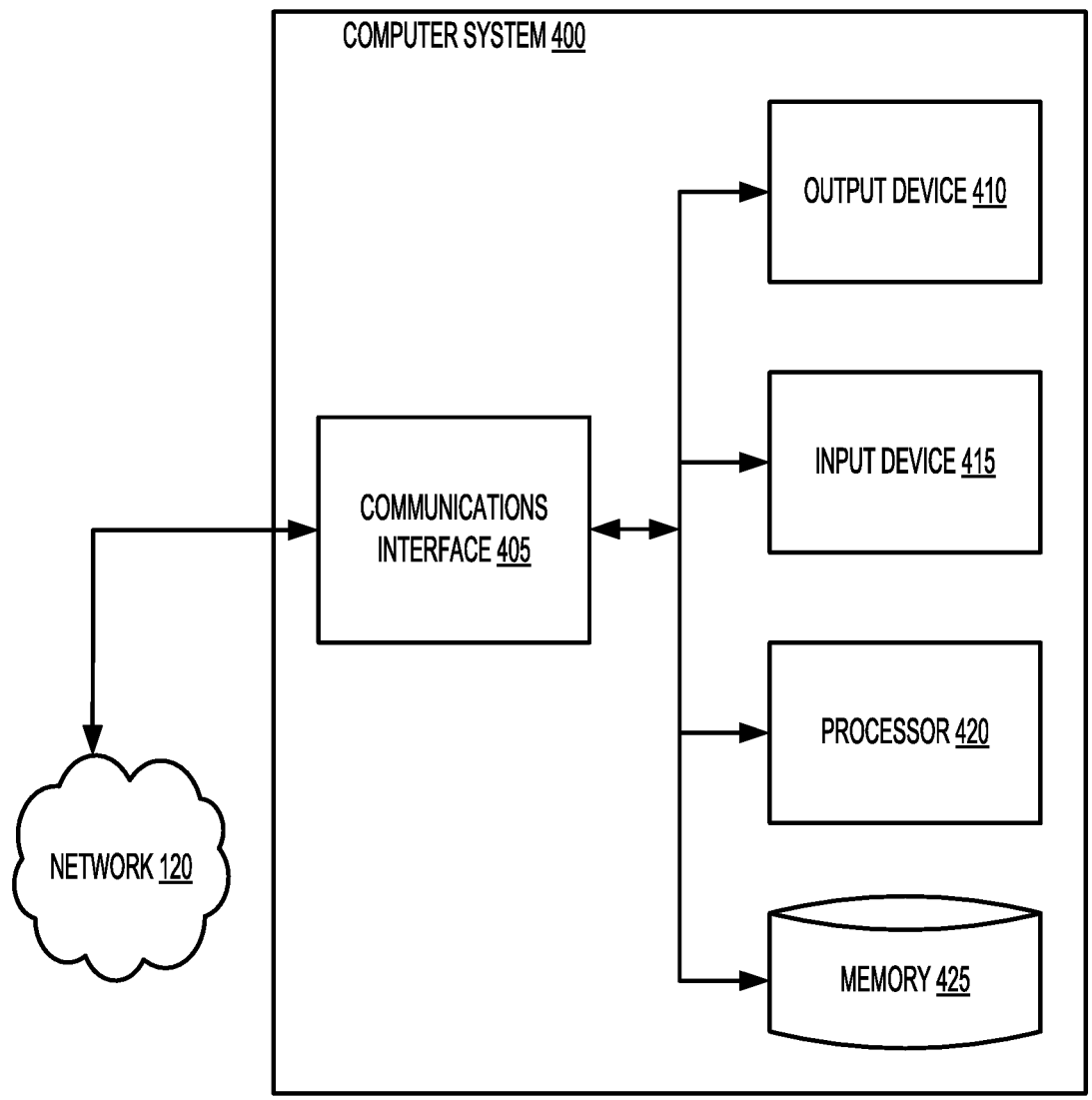
FIG. 4 shows the general architecture of an illustrative computer system that may be employed to implement any of the computer systems discussed herein.

FIG. 4 shows the general architecture of an illustrative computer system 400 that may be employed to implement any of the computer systems discussed herein in accordance with some implementations. The computer system 400 can be used to provide information via the network 120 for display. The computer system 400 of FIG. 4 comprises one or more processors 420 communicatively coupled to memory 425, one or more communications interfaces 405, and one or more output devices 410 (e.g., one or more display units) and one or more input devices 415. The processors 420 can be included in the personal communication device 102 or the other components of the system 100.

In the computer system 400 of FIG. 4, the memory 425 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 400 of FIG. 4, the computer system 400 can include the memory 425 to store information related to the use of the nicotine dispenser 110, among others. The processor(s) 420 shown in FIG. 4 may be used to execute instructions stored in the memory 425 and, in so doing, also may read from or write to the memory various information processed and or generated pursuant to execution of the instructions.

The processor 420 of the computer system 400 shown in FIG. 4 also may be communicatively coupled to or control the communications interface(s) 405 to transmit or receive various information pursuant to execution of instructions. For example, the communications interface(s) 405 may be coupled to a wired or wireless network, bus, or other communication means and may therefore allow the computer system 400 to transmit information to or receive information from other devices (e.g., other computer systems). While not shown explicitly in the system of FIG. 4, one or more communications interfaces facilitate information flow between the components of the system 400. In some implementations, the communications interface(s) may be configured (e.g., via various hardware components or software components) to provide a website as an access portal to at least some aspects of the computer system 400. Examples of communications interfaces 405 include user interfaces (e.g., web pages).

The output devices 410 of the computer system 400 shown in FIG. 4 may be provided, for example, to allow various information to be viewed or otherwise perceived in connection with execution of the instructions. The input device(s) 415 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the third-party computing device 130 can include clients and servers. For example, the third-party computing device 130 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the third-party computing device 130 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for verifying an identity of a user of a nicotine dispenser, the system comprising:
   a nicotine dispenser configured to remain locked until an identification signal has been received, the nicotine dispenser configured to communicate via a wireless communication link and to unlock use of the nicotine dispenser responsive to receiving the identification signal;
   a personal communication device in communication with the nicotine dispenser via the wireless communication link, and having an application configured to perform verification of identification data of a user, the application having stored an association of the identification data of the user with the nicotine dispenser;
   wherein the application is configured to:
      scan the identification data of the user;
      responsive to determining that the identification data of the user is verifiable, and responsive to determining that the identification data satisfies a first verification technique, retrieve information stored in a user profile that indicates the user is associated with the nicotine dispenser and comprises verified user information, wherein the user profile identifies an ape of the user;
      perform a second verification technique based on the verified user information in the user profile, including one of facial recognition or vocal recognition, via one or more sensors at the personal communication device;
      generate the identification signal responsive to the user profile including the indication that the user is associated with the nicotine dispenser and responsive to both the first verification technique and the second verification technique being satisfied; and
      responsive to generating the identification signal, communicate the identification signal to the nicotine dispenser via the wireless communication link;
      provide, upon detecting use of the nicotine dispenser via the wireless communication link, a notification of use to a third-party computing device, the notification comprising location data of the nicotine dispenser during the use of the nicotine dispenser;
      responsive to the third-party computing device detecting overuse of the nicotine dispenser based on the location data, receive, from the third-party computing device, an indication that the nicotine dispenser is to be locked; and
      responsive to the indication, transmit a lock signal to the nicotine dispenser, causing a processor of the nicotine dispenser to prevent transmission of electrical power to a nicotine-containing unit of the nicotine dispenser.

2. The system of claim 1, wherein the nicotine dispenser is further configured to receive the identification signal via the wireless communication link, wherein the identification signal indicates the age of the user is greater than a predetermined threshold.

3. The system of claim 1, wherein the application is further configured to verify the identification data of the user based on a comparison between the age of the user and a predetermined threshold.

4. The system of claim 1, wherein the nicotine dispenser is attributed with a unique identifier.

5. The system of claim 4, wherein the user is registered as the user of the nicotine dispenser based on a registration via at least one of the application or a server, the registration creating the user profile of the user, the user profile including the unique identifier of the nicotine dispenser.

6. The system of claim 5, wherein the user profile of the user is stored by at least one of the application or the server responsive to the registration.

7. The system of claim 1, wherein the application is further configured to verify the identification data of the user based on at least one of: voice recognition, facial recognition, biometric recognition, or personal identification recognition.

8. The system of claim 1, wherein the nicotine dispenser further comprises a micro-chip and the nicotine-containing unit, wherein the micro-chip is configured to one of enable or activate the nicotine-containing unit.

9. The system of claim 8, wherein the processor of the nicotine dispenser is further configured to receive the identification signal via the wireless communication link and communicate with the micro-chip to one of enable or activate the nicotine-containing unit.

10. A system for monitoring and controlling use of a nicotine dispenser, the system comprising:
    a nicotine dispenser comprising a hardware processor and a nicotine-containing unit, wherein the hardware processor is configured to:
       retrieve information stored in a user profile that indicates a user is associated with the nicotine dispenser and comprises verified user information, wherein the user profile identifies an ape of the user;
       monitor an amount of nicotine dispensed by the nicotine-containing unit to the user over a period of time;
       determine, responsive to monitoring, that the amount of nicotine dispensed by the nicotine-containing unit to the user over the period of time is greater than a predetermined use threshold;
       lock the nicotine-containing unit by preventing transmission of electrical power to the nicotine-containing unit until a predetermined unlock date and time responsive to determining that the amount of nicotine dispensed to the user over the period of time is greater than the predetermined use threshold;
       unlock the nicotine-containing unit by allowing transmission of electrical power to the nicotine-containing unit;
       provide, upon detecting use of the nicotine dispenser, a notification of use to a personal communication device via a wireless communication link, the notification of use causing the personal communication device to transmit the notification of use to a third-party computing device, the notification comprising location data of the nicotine dispenser during the use of the nicotine dispenser;
       responsive to the third-party computing device detecting overuse of the nicotine dispenser based on the location data, receive a lock signal from the third-party computing device via the personal communication device and the wireless communication link; and responsive to the lock signal, lock the nicotine-containing unit by preventing transmission of electrical power to the nicotine-containing unit.

11. The system of claim 10, wherein the nicotine-containing unit comprises a micro-chip, and wherein the hardware processor is further configured to communicate with the micro-chip to lock or unlock the nicotine-containing unit.

12. The system of claim 11, wherein the hardware processor is further configured to communicate with the micro-chip to determine a compatibility of the nicotine-containing unit.

13. The system of claim 12, wherein the hardware processor is further configured to unlock the nicotine-containing unit responsive to determining that the nicotine-containing unit is compatible.

14. The system of claim 10, wherein the hardware processor is further configured to communicate with the third-party computing device to receive the predetermined use threshold.

15. The system of claim 14, wherein the hardware processor is further configured to communicate with the third-party computing device to provide a lock indication responsive to locking the nicotine-containing unit.

16. The system of claim 14, wherein the hardware processor is further configured to lock or unlock the nicotine-containing unit responsive to receiving a signal from the third-party computing device.

17. The system of claim 14, wherein the hardware processor is further configured to transmit one of time data regarding use of the nicotine dispenser to the third-party computing device responsive to use of the nicotine-containing unit.

18. The system of claim 10, wherein the hardware processor is further configured to lock the nicotine-containing unit responsive to a predetermined time period of non-use.

19. The system of claim 10, wherein the hardware processor is further configured to unlock the nicotine-containing unit responsive to determining a time-of-day corresponds to a predetermined value.

* * * * *